United States Patent
Wood et al.

(10) Patent No.: US 12,369,520 B2
(45) Date of Patent: Jul. 29, 2025

(54) MAGNETIC INDEXING OF AGRICULTURAL SENSORS

(71) Applicant: Intelligent Agricultural Solutions LLC, Fargo, ND (US)

(72) Inventors: Dan Wood, Fargo, ND (US); Ross Eickhoff, Fargo, ND (US); Dan Bjertness, Fargo, ND (US)

(73) Assignee: Precision Planting LLC, Tremont, IL (US)

( * ) Notice: Subject to any disclaimer, the term of this patent is extended or adjusted under 35 U.S.C. 154(b) by 450 days.

(21) Appl. No.: 17/811,039

(22) Filed: Jul. 6, 2022

(65) Prior Publication Data

US 2023/0028107 A1 Jan. 26, 2023

Related U.S. Application Data

(60) Provisional application No. 63/224,124, filed on Jul. 21, 2021, provisional application No. 63/224,119, filed on Jul. 21, 2021.

(51) Int. Cl.
*A01C 23/00* (2006.01)
*A01B 79/00* (2006.01)
(Continued)

(52) U.S. Cl.
CPC .......... *A01C 23/007* (2013.01); *A01B 79/005* (2013.01); *A01C 23/047* (2013.01); *A01M 7/0089* (2013.01); *G01F 1/34* (2013.01)

(58) Field of Classification Search
CPC ..... A01B 79/005; A01B 76/00; A01C 23/007; A01C 23/047; G01F 1/34
(Continued)

(56) References Cited

U.S. PATENT DOCUMENTS

| 5,144,767 A | 9/1992 | McCloy et al. |
| 7,311,004 B2 | 12/2007 | Giles |

(Continued)

FOREIGN PATENT DOCUMENTS

| EP | 2995382 A1 | 3/2016 |
| WO | 0116661 A1 | 3/2001 |

OTHER PUBLICATIONS

European Patent Office, International Search Report related to International Patent Application No. PCT/IB2022/055865, mail date Sep. 29, 2022.

*Primary Examiner* — Lisa M Caputo
*Assistant Examiner* — Joshua L Forristall

(57) ABSTRACT

A monitoring system for an agricultural sprayer includes spray nozzles, spray monitoring sensors, electromagnetic sensors, and control circuitry in electronic communication with the electromagnetic sensors. Each spray nozzle is configured to spray a fluid. Each spray monitoring sensor is disposed adjacent to a corresponding one of the spray nozzles and is configured to measure a spray parameter of that spray nozzle. The electromagnetic sensors are configured to generate signals when the electromagnetic sensors sense a magnetic field. Each electromagnetic sensor is disposed adjacent to and each of is representative of one of the spray monitoring sensors. The control circuitry is configured to receive the signals from the electromagnetic sensors in a received signal order and assign physical locations to the spray monitoring sensors based on the sequential communication order and a predetermined sequential order. Related methods and systems are also disclosed.

14 Claims, 18 Drawing Sheets

(51) Int. Cl.
  *A01C 23/04*    (2006.01)
  *A01M 7/00*    (2006.01)
  *G01F 1/34*    (2006.01)
(58) Field of Classification Search
  USPC .......................................................... 702/50
  See application file for complete search history.

(56) References Cited

U.S. PATENT DOCUMENTS

| | | |
|---|---|---|
| 7,502,665 B2 | 3/2009 | Giles et al. |
| 7,916,282 B2 | 3/2011 | Duineveld et al. |
| 9,532,563 B2 | 1/2017 | Arenson et al. |
| 2009/0112372 A1 | 4/2009 | Peterson |
| 2011/0160920 A1 | 6/2011 | Orr |
| 2012/0211572 A1 | 8/2012 | Peterson et al. |
| 2012/0271467 A1* | 10/2012 | Grimm ............... A01M 7/0089 700/283 |
| 2013/0037625 A1* | 2/2013 | Arenson ............. A01M 7/0089 239/71 |
| 2016/0175869 A1 | 6/2016 | Sullivan et al. |
| 2018/0015490 A1 | 1/2018 | Grimm et al. |
| 2018/0257678 A1 | 9/2018 | Monette et al. |
| 2019/0083992 A1 | 3/2019 | Funseth et al. |
| 2019/0150423 A1 | 5/2019 | Ni |
| 2019/0351141 A1 | 11/2019 | Veasey et al. |
| 2020/0113170 A1 | 4/2020 | Davis et al. |
| 2022/0192174 A1* | 6/2022 | Humpal .............. A01M 7/0042 |
| 2022/0272959 A1 | 9/2022 | Bremer et al. |

* cited by examiner

MAGNETIC INDEXING OF AGRICULTURAL SENSORS

CROSS-REFERENCE TO RELATED APPLICATIONS

This application claims the benefit of the filing date of U.S. Provisional Patent Application 63/224,124, "Magnetic Indexing of Agricultural Sensors;" and U.S. Provisional Patent Application 63/224,119, "Spray Monitoring System;" each filed Jul. 21, 2021, the entire disclosure of each of which is incorporated herein by reference.

FIELD

This disclosure relates generally to the field of precision agriculture. In particular, the disclosure relates to systems, methods, and devices for controlling spray quality of agricultural sprayers.

BACKGROUND

Agricultural sprayers apply fluid to a field by emitting multiple individual sprays of fluid. Nozzles generate each of those individual sprays and are spaced along the width of a boom. Agricultural sprayers can be configured to spray a wide variety of fluids, such as pesticides, herbicides, water, and fertilizers, among other possibilities. Different fluids sprayed by agricultural sprayers have different chemical properties that affect the spray characteristics when sprayed, requiring a spraying system to be adjusted based on the type of fluid being sprayed. Further, the spraying system may need to be adjusted based on the type of nozzle used to generate the spray.

If a spraying system is not adjusted correctly for the fluid being sprayed, a suboptimal spray can result. Further, suboptimal spray can also occur if a nozzle has worn during repeated operation, or sediment or another obstruction has blocked the nozzle. Suboptimal spray has undesirable spray characteristics and can cause over-application or under-application of the fluid being sprayed.

SUMMARY

In some embodiments, a monitoring system for an agricultural sprayer includes spray nozzles, spray monitoring sensors, electromagnetic sensors, and control circuitry in electronic communication with the electromagnetic sensors. Each spray nozzles is configured to spray a fluid. Each spray monitoring sensor is disposed adjacent to a corresponding spray nozzles and is configured to measure a spray parameter of that spray nozzle. The electromagnetic sensors are configured to generate signals when the electromagnetic sensors sense a magnetic field. Each electromagnetic sensors is disposed adjacent to and each signal is representative of one of the spray monitoring sensors. The control circuitry is configured to receive the signals from the electromagnetic sensors in a received signal order and assign physical locations to the spray monitoring sensors based on the sequential communication order and a predetermined sequential order.

A method of locating spray monitoring sensors includes sensing a magnetic field at each of a plurality of electromagnetic sensors in a predetermined sequential order to generate signals representative of the spray monitoring sensors, communicating the signals, receiving the signals in a received signal order, and assigning physical locations to the spray monitoring sensors. The electromagnetic sensors communicate the signals when each of the electromagnetic sensors senses the magnetic field. Each electromagnetic sensor is disposed adjacent to one of the spray monitoring sensors. Each spray monitoring sensor is disposed adjacent to and is configured to measure a spray parameter of one of the spray nozzles. The signals are received by control circuitry and the physical locations are assigned by the control circuitry.

DETAILED DESCRIPTION

The present disclosure includes monitoring systems for monitoring agricultural spray systems, various graphical user interfaces (GUIs) for use with agricultural spray monitoring systems, methods and systems for indexing sensors used in agricultural spray systems, and methods for detection of spray nozzle faults and/or wear. The present disclosure further includes methods for generating parameters useful for displaying complex data obtained from agricultural spray monitoring systems. The monitoring systems disclosed herein improve the accuracy and detail with which various spray parameters of agricultural spray systems can be monitored. The various GUIs and methods disclosed herein can enable an operator to quickly and easily visualize and understand data generated by agricultural spray monitoring systems, including the spray monitoring systems disclosed herein. The indexing systems and methods disclosed herein may improve the ease and efficiency of indexing agricultural spray sensors and decrease labor costs associated with indexing agricultural spray sensors. The spray nozzle fault and wear detection systems and methods disclosed herein may improve the ease and efficiency and decrease labor costs associated with detecting spray nozzle wear. These improvements may individually and collectively enable more efficient and effective agricultural spraying of herbicides, pesticides, fertilizers, etc.

Spray Monitoring System

Figure 1:
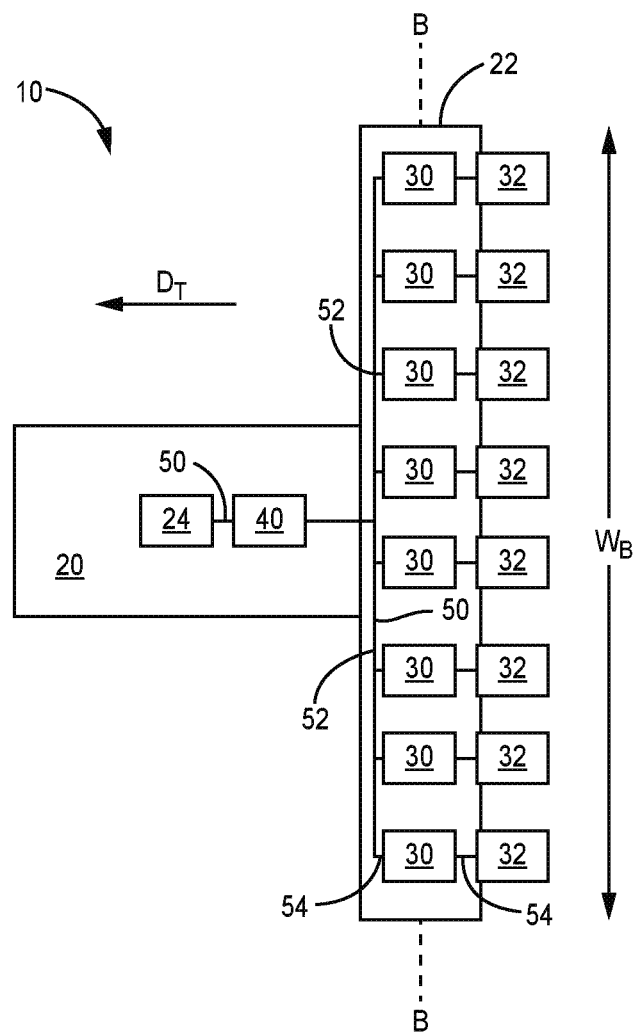
FIG. 1 is a schematic depiction of a spray system.

FIG. 1 is a schematic depiction of spray system 10, which includes vehicle 20, boom 22, fluid tank 24, spray monitoring sensors 30, spray nozzles 32, pump 40, and fluid lines 50. Fluid lines 50 include trunk portions 52 and branch portions 54.

Spray system 10 is used to spray a fluid over an area, such as an agricultural field. The fluid sprayed by spray system 10 may include a pesticide or herbicide, but can be any fluid.

Vehicle 20 is used to move spray system 10 over a large area and can be, for example, a tractor or a utility task vehicle (UTV), among other options. Boom 22 is mounted to vehicle 20 such that it is centered on vehicle 20 and extends a width $W_B$ along axis B-B, which is transverse to a direction of travel $D_T$ of vehicle 20. Because boom 22 is mounted transversely to the direction of travel $D_T$ of vehicle 20, the total area sprayed by spray system 10 can be approximately equivalent to the distance traveled by vehicle 20 multiplied by the width $W_B$ of boom 22.

Fluid tank 24 and pump 40 may be positioned on vehicle 20. Spray monitoring sensors 30 and spray nozzles 32 are positioned on boom 22. Fluid lines 50 fluidly connect fluid tank 24 to spray nozzles 32 and include trunk portions 52 and branch portions 54. Trunk portions 52 of fluid lines 50 may extend parallel to axis B-B along boom 22. Branch portions 54 may extend from trunk portions 52 perpendicular to axis B-B and form a downstream portion of fluid lines 50. Spray monitoring sensors 30 are disposed along branch portions 54 of fluid lines 50 adjacent to spray nozzles 32. As described below, spray monitoring sensors 30 can measure pressure and flow rate of fluid flowing through fluid lines 50. Each spray monitoring sensor 30 is positioned adjacent to a single spray nozzle 32. This configuration allows each spray monitoring sensor 30 to measure the pressure and flow rate of a single spray nozzle 32, which provides advantages discussed in more detail with respect to FIGS. 2-3. For simplicity, spray monitoring sensors 30 are shown adjacent spray nozzles 32 along boom 22, but in some examples nozzles 32 are integrated into or directly attached to spray monitoring sensors 30.

In operation, pump 40 pumps fluid from fluid tank 24 through fluid lines 50 to each spray nozzle 32. Pump 40 can be a positive-displacement pump, a centrifugal pump, or any other suitable pump. Fluid tank 24 holds the fluid to be sprayed by spray nozzles 32, and can be any selected shape, structure, or material.

Spray nozzles 32 are configured to generate a spray of the fluid pumped by pump 40. Spray nozzles 32 can be of any selected size, shape, or spray angle, such as full cone, hollow cone, flat fan, or any combination thereof. The spacing of spray nozzles 32 on boom 22 can be determined by the spray angle of the chosen spray nozzles 32, such that the overlap between adjacent spray nozzles 32 produces a selected fluid application pattern.

Spray system 10 is shown as having eight spray nozzles 32 for illustrative purposes. Spray system 10 can include large numbers of spray nozzles 32 on boom 22, with each spray nozzle 32 positioned adjacent to a single spray monitoring sensor 30, as illustrated in the example of spray system 10. In some examples, spray system 10 has 140 or more spray nozzles 32 spread across boom 22 and an equal number of spray monitoring sensors 30 positioned adjacent to the spray nozzles 32.

Figure 2:
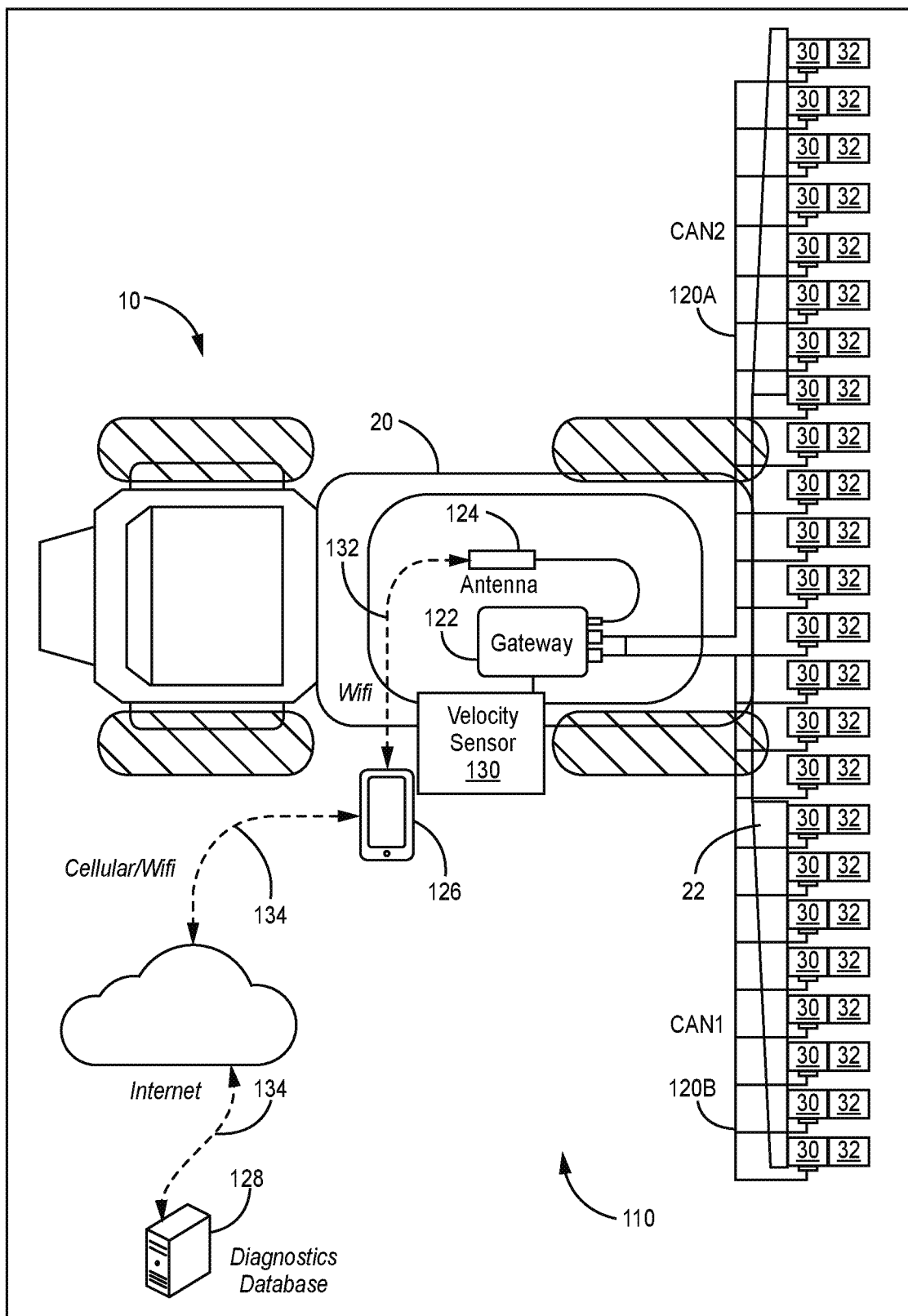
FIG. 2 is a schematic depiction of a spray monitoring system for monitoring the spray system of FIG. 1.

FIG. 2 is a schematic depiction of spray monitoring system 110 for monitoring spray system 10. Spray system 10 includes vehicle 20, boom 22 and spray nozzles 32, as shown in FIG. 1 and described above. Spray monitoring system 110 includes spray monitoring sensors 30, signal buses 120A, 120B, gateway 122, antenna 124, handheld device 126, diagnostics database 128, velocity sensor 130, communication link 132, and communication link 134. For simplicity, fluid tank 24, pump 40, fluid lines 50, axis B-B, boom width $W_B$, and direction of travel $D_T$ are not depicted in FIG. 2. Spray monitoring system 110 enables monitoring of flowrate, pressure, or both for individual spray nozzles 32.

Each of spray monitoring sensors 30 does and can monitor both the flowrate and pressure of a single spray nozzle 32 located along boom 22. As used herein, "pressure" refers to the backpressure at each spray nozzle 32, and "flowrate" refers to the volume of fluid per unit time that passes through each spray nozzle 32. Spray monitoring sensors 30 can include discrete pressure and flow rate sensors. The pressure and flowrate sensors (shown in more detail in FIG. 3) can be configured to track pressure and flow rate, respectively, over time by making multiple measurements spaced by a measurement interval. The measurement interval can be, for example, 0.5 seconds, 1 second, 2 seconds, or another interval for tracking pressure and flow rate over time. Generally, the pressure and flow rate sensors have the same measurement interval, thereby allowing both pressure and flow rate to be known for each spray nozzle 32 in spray monitoring system 110 at a given point in time, though the pressure and flow rate sensors can have different measurement intervals in some embodiments.

As described previously with respect to FIG. 1, spray monitoring sensors 30 are disposed adjacent to spray nozzles 32 along boom 22. Advantageously, disposing spray monitoring sensors 30 adjacent to spray nozzles 32 increases the accuracy with which spray monitoring sensors 30 can measure pressure and flow rate at each spray nozzle 32. However, spray monitoring sensors 30 can be disposed at any location in the flow path between pump 40 and spray nozzles 32. Similarly, the individual components of spray monitoring sensors 30 can be disposed at any location in the flow path between pump 40 and spray nozzles 32.

Velocity sensor 130 measures the velocity or speed of spray nozzles 32 relative to ground. Because spray nozzles 32 generally move at the same speed due to their fixed position along boom 22, spray monitoring system 110 only requires one velocity sensor 130. Because boom 22, vehicle 20, antenna 124, gateway 122, signal buses 120A, 120B, and spray monitoring sensors 30 have fixed positions and move at the same speed, velocity sensor 130 can measure the velocity, for example, of any of these components. Though spray monitoring system 110 is described herein as only having one velocity sensor 130, in some embodiments, it may be advantageous to have multiple velocity sensors. In some examples, the direction of motion does not need to be measured and velocity sensor 130 can be a speed sensor for measuring a ground speed of spray nozzles 32.

Gateway 122 and antenna 124 are disposed on vehicle 20. Signal buses 120A, 120B have a portion that is disposed along boom 22 to connect to spray monitoring sensors 30 and a portion disposed on vehicle 20 to connect to gateway 122. Handheld device 126 need not be attached to other components of spray monitoring system 110, and handheld device 126 can be separately portable. However, in some examples, handheld device 126 can be a stationary or non-portable computer device, or a component of a broader system. Diagnostics database 128 need not be attached to other components of spray monitoring system 110 and is generally disposed away from other components of spray monitoring system 110 at a remote location. Velocity sensor 130 is attached to a portion of vehicle 20 or boom 22 so that velocity sensor 130 can measure the velocity of spray nozzles 32 as vehicle 20 moves.

Velocity sensor 130 can take any selected form, such as a global positioning system (GPS) or global navigation satellite system (GNSS) sensor, a speedometer, another speed sensor integrated into vehicle 20, or any other sensor for measuring the velocity of spray nozzles 32.

Spray monitoring sensors 30 communicate with gateway 122 over one or both of signal buses 120A, 120B. Signal buses 120A, 120B are communication systems that transfer data between gateway 122 and spray monitoring sensors 30. Signal buses 120A, 120B are depicted as control area network (CAN) buses, but can be any suitable bus. Signal buses 120A and 120B are disposed along different arms of boom 22, such that each of signal buses 120A and 120B connects the spray monitoring sensors 30 from one arm of boom 22 to gateway 122. In some examples, however, a single signal bus is used in place of dual signal buses 120A and 120B.

Each spray monitoring sensor 30 is individually identified via a unique identifier and can communicate individually over signal bus(es) 120A, 120B to gateway 122. The unique identifier can be, for example, a serial number and can be communicated with spray parameter data to allow control circuitry in gateway 122 and/or handheld device 126 to individually identify spray parameter data generated by each spray monitoring sensor 30. As will be explained in more detail subsequently and particularly with respect to FIGS. 13-14, an identifier for each spray monitoring sensor 30 can be associated with a position along boom 22 or another physical location. The location can be stored to one or both of memory 152, 162 and one or both of control circuitry 150, 160 can cause a user interface on handheld device 126 to display the location information with the spray monitoring data from each spray monitoring sensor 30. Because each spray monitoring sensor 30 senses spray parameters of and is disposed adjacent to a single spray nozzle 32, an operator can locate poorly performing spray nozzles 32 based on the spray parameter and location information displayed by the user interface.

Individual spray parameter data can then be communicated to, for example, handheld device 126 and/or diagnostics database 128. Velocity sensor 130 also communicates with gateway 122. Gateway 122 is electronically connected to antenna 124 and can communicate with handheld device 126 over communication link 132. The combination of signal buses 120A, 120B, gateway 122, antenna 124, and communication link 132 allows handheld device 126 to communicate with spray monitoring sensors 30.

Gateway 122 is a networking device configured to communicate information from spray monitoring sensors 30 to handheld device 126. Handheld device 126 is a user interface device configured to perform methods disclosed herein. Handheld device 126 can be a tablet, smartphone, or other handheld device. Antenna 124 is configured to receive a radio signal from handheld device 126 and to transmit a radio signal from gateway 122 to handheld device 126.

Handheld device 126 is connected to gateway 122 via communication link 132 and is connected to diagnostics database 128 via communication link 134. Communication links 132 and 134 are shown as wireless connections, but in some embodiments communication links 132 and 134 are wired connections.

Diagnostics database 128 is configured to receive and store data from handheld device 126. Diagnostics database 128 can include one or more data storage devices for storing data received from handheld device 126. Diagnostics database 128 can, for example, store pressure, flowrate, application density, droplet size, and velocity data generated by spray monitoring system 110. An operator can operate handheld device 126 to recall data stored on diagnostics database 128 to handheld device 126 via communication link 134. Data stored in diagnostics database 128 can be used to diagnose and remedy persistent errors that indicate that a portion of spray system 10 requires maintenance. For example, diagnostics database 128 can be used to diagnose an error related to one of spray monitoring sensors 30 or spray nozzles 32. Errors can be determined by comparing, for example, changes in spray parameter data over time or by comparing stored spray parameter data to ideal values, as will be discussed in more detail subsequently, and particular with respect to FIGS. 15A-16B. Similarly, diagnostics database 128 can be used to identify and reduce operator errors associated with spray application.

Figure 3:
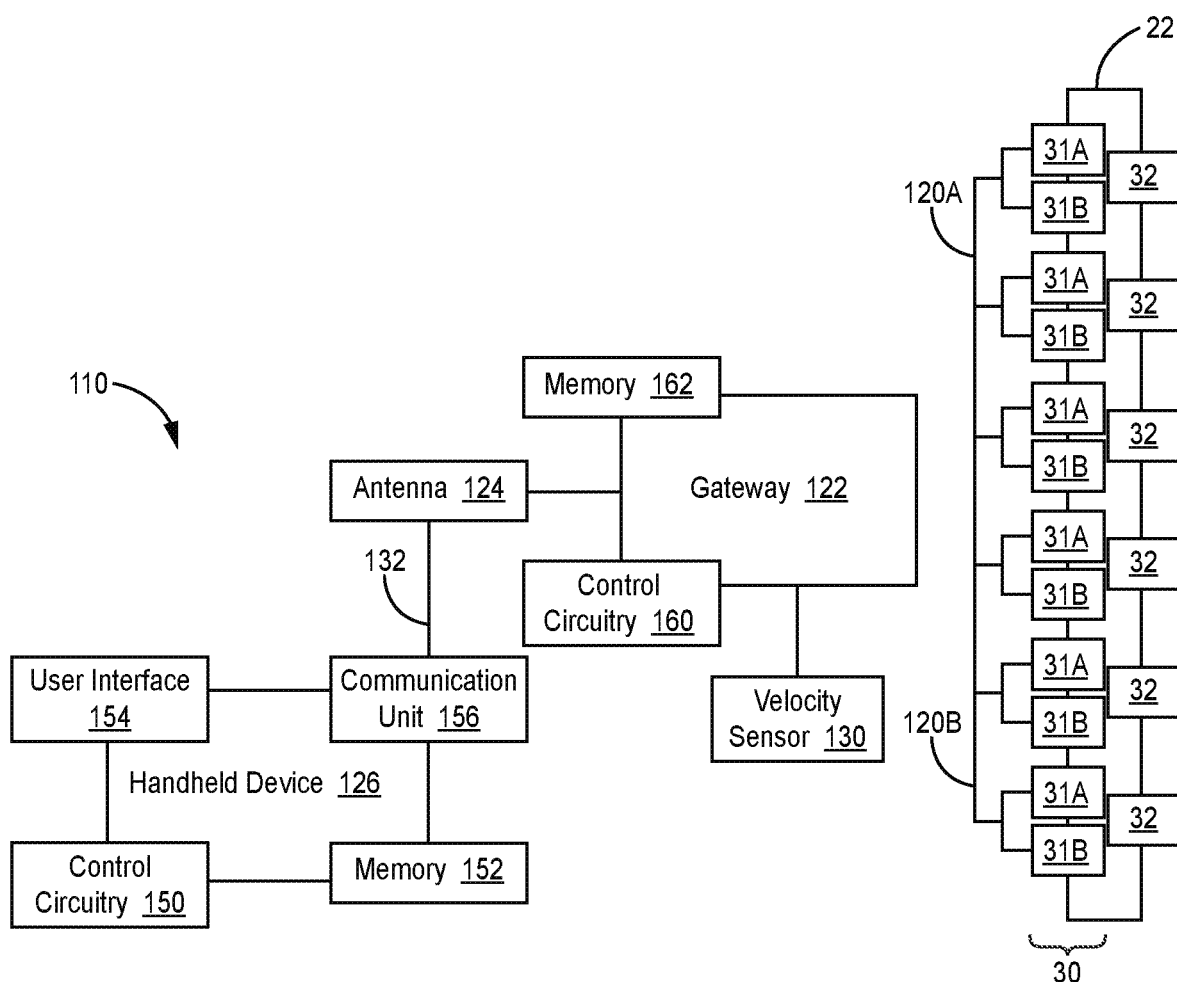
FIG. 3 is a schematic depiction of a handheld device and a gateway of the spray monitoring system depicted in FIG. 2.

FIG. 3 is a schematic depiction of handheld device 126 and gateway 122 of spray monitoring system 110. Spray monitoring system 110 as depicted in FIG. 3 includes spray monitoring sensors 30 (including pressure sensors 31A and flow rate sensors 31B), signal buses 120A and 120B, handheld device 126, gateway 122, antenna 124, and communication link 132. FIG. 3 illustrates components of handheld device 126 and gateway 122. Handheld device 126 includes control circuitry 150, memory 152A, user interface 154, and communication unit 156. Gateway 122 includes control circuitry 160 and memory 162.

Gateway 122 is electronically connected to each pressure sensor 31A and each flow rate sensor 31B. Control circuitry 160 of gateway 122 is configured to receive pressure and flow rate measurements from pressure sensors 31A and flow rate sensors 31B, respectively. The measurements can be stored to memory 162 or transmitted to handheld device 126 via communication link 132. Gateway 122 is also electronically connected to velocity sensor 130. Control circuitry 160 can receive velocity measurements from velocity sensors 130. Control circuitry 160 of gateway 122 can also perform one or more of the methods described herein.

Handheld device 126 is electronically connected to gateway 122. Control circuitry 150 can receive pressure measurements, flow rate measurements, and velocity measurements from control circuitry 160 of gateway 122 and use the control circuitry to perform one or more methods described herein. Further, control circuitry 150 can transmit commands or instructions to control circuitry 160 that can be executed by control circuitry 160 to control operation of one or more of pressure sensors 31A and flow rate sensors 31B. An operator can interact with user interface 154 of handheld device 126 to control the operation of control circuitry 150 in order to, for example, set target values, select between views of aggregate and non-aggregate spray parameter data, and control operation of the various GUIs described herein.

The depiction of spray monitoring system 110 in FIG. 3 shows spray monitoring sensors 30 each having a discrete pressure sensors 31A and flow rate sensors 31B. Pressure sensors 31A and flow rate sensors 31B are components of spray monitoring sensors 30 in the depicted embodiment. Each of pressure sensors 31A and each of flow rate sensors 31B are disposed adjacent to and measure the pressure and flow rate, respectively, of a single spray nozzle 32. Pressure sensors 31A and flow rate sensors 31B are connected to gateway 112 via signal buses 120A, 120B. Control circuitry 160 of gateway 122 can receive pressure and flow rate measurements from pressure sensors 31A and flow rate sensors 31B, respectively. Control circuitry 160 can send the received pressure and flow rate measurements to handheld device 126 via antenna 124 and communication link 132 and/or perform one or more methods described herein to, for example, use the received measurements to determine additional spray parameter information or create one or more icons representative of pressure, flow rate, or another spray parameter. Control circuitry 160 is also able to recall instructions and other information from memory 162 and is further able to execute the recalled instructions. Control circuitry 160 is also able to receive information from velocity sensor 130 for display by user interface 154 or for one or more methods described herein.

In the example depicted in FIG. 3, pressure sensors 31A and flow rate sensors 31B are connected to signal buses 120A, 120B in pairs. Advantageously, this allows the same identifier (e.g., serial number) to be used for each pair of pressure sensors 31A and flow rate sensors 31B, allowing control circuitry 150, 160 to assign the same identifier to all spray parameter data produced for an individual spray nozzle 32. This allows an operator to correlate data with individual spray nozzles 32 along boom 22 rather than individual flow rate sensors 31B or pressure sensors 31A, increasing the ease and efficiency with which an operator can locate poorly performing spray nozzles 32. In other examples, pressure sensors 31A and flow rate sensors 31B are connected to signal buses 120A, 120B but send the same identifier to control circuitry 150, 160. In yet further examples, pressure sensors 31A and flow rate sensors 31B are connected individually and have unique identifiers.

Pressure sensors 31A and flow rate sensors 31B can be configured to track pressure and flow rate, respectively, over time by making multiple measurements spaced by a measurement interval, as described above.

Control circuitry 150 of the handheld device 126 is able to receive data from each of pressure sensors 31A and each of flow rate sensors 31B via gateway 122 and communication link 132. Control circuitry 150 is also able to recall instructions and other information from memory 152, and is further able to execute the recalled instructions. Control circuitry 150 is also able to receive information from velocity sensor 130 via gateway 122 and communication link 132 for display by user interface 154 or for one or more methods described herein. Control circuitry 150 is also able to control user interface 154 and can cause user interface 154 to display, for example, one or more icons or text via a display device of handheld device 126.

Figure 6:
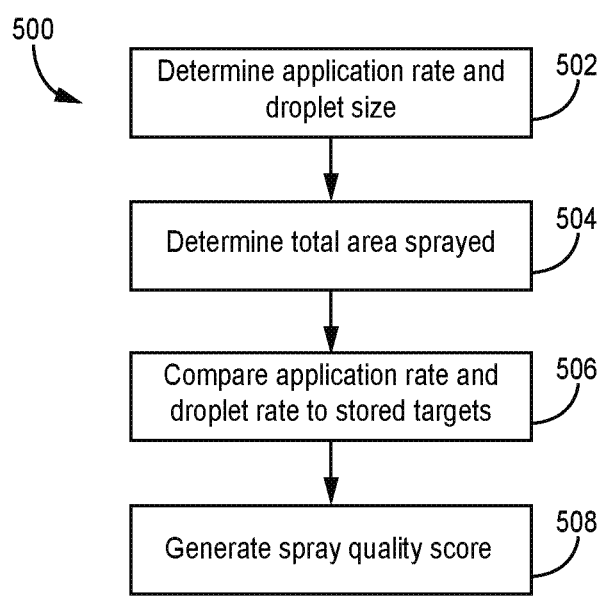
FIG. 6 is a flow diagram for a method of generating a spray quality score.

Control circuitry 150 is configured to receive flowrate and pressure measurements from spray monitoring sensors 30, and is further configured to receive velocity measurements from velocity sensor 130. Control circuitry 150 can track the time in which velocity sensor 130 reports a non-zero value and convert the received velocity measurements into the distance traveled by spray nozzles 32. Control circuitry 150 can use the distance traveled by spray nozzles 32 in combination with the width of boom 22 to determine an area over which fluid is sprayed during the operation of spray system 10. Control circuitry 150 can, for example, generate droplet size and/or application density, generate a spray quality score (see FIGS. 6-7), create a persistent alarm (see FIGS. 8-9), create spray nozzle groups and icons representing spray nozzle groups (see FIGS. 10-11), index spray monitoring sensors (see FIGS. 13-14), and determine spray nozzle wear (see FIGS. 15A-16B). Information generated by control circuitry 150 can be displayed by user interface 154 as, for example, text or one or more icons for use by an operator of spray system 10 (see FIGS. 4, 7, 8, and 12).

Memory 152 stores instructions to perform any method described herein. For example, memory 152 can store instructions that can be executed by control circuitry 150 to for example, generate droplet size and/or application density, generate a spray quality score (see FIGS. 6-7), create a persistent alarm (see FIGS. 8-9), create spray nozzle groups and icons representing spray nozzle groups (see FIGS. 10-11), index spray monitoring sensors (see FIGS. 13-14), and determine spray nozzle wear (see FIGS. 15A-16B). Memory 152 can also store various icons and other information that can be displayed by user interface 154.

User interface 154 allows an operator to receive information received or generated by control circuitry 150. User interface 154 can display a GUI and/or present information to an operator as text or as one or more icons. User interface 154 can be of any form that enables operator interaction with control circuitry 150. Where user interface 154 is configured to display information as text or icons, handheld device 126 can include a display device for displaying information. For example, user interface 154 can be a GUI displayed at a display device of handheld device 126 for presenting information to and/or receiving input from an operator. User interface 154 can be, for example, GUI 310 (FIG. 4), GUI 600 (FIG. 7), or GUI 700 (FIG. 8). User interface 154 can include graphical navigation and control elements, such as graphical buttons or other graphical control elements. User interface 154, in some examples, includes physical navigation and control elements, such as physically actuated buttons or other physical navigation and control elements. User interface 154 can also include audio elements, such as a microphone and/or speakers, to facilitate audio communication with the operator.

Communication unit 156 transmits and receives radio signals and can be any suitable device for facilitating data transmission between handheld device 126 and gateway 122. Communication unit 156 can include, for example, one or more antennas, radio-frequency transceivers, amplifiers, and/or filter circuits, among other options.

As illustrated in FIG. 3, gateway 122 includes control circuitry 160 and memory 162. Like control circuitry 150, control circuitry 160 can perform any method described herein. Control circuitry 160 can, for example, receive pressure measurements from pressure sensors 31A, receive flow rate measurements from flow rate sensors 31B, receive velocity measurements from velocity sensor 130, calculate the area sprayed by spray system 10, generate droplet size and/or application density, generate a spray quality score (see FIGS. 6-7), create a persistent alarm (see FIGS. 8-9), create spray nozzle groups and icons representing spray nozzle groups (FIGS. 10-11), index spray monitoring sensors (see FIGS. 13-14), and determine spray nozzle wear (see FIGS. 15A-16B). Information generated by control circuitry 160 can be transmitted to handheld device 126 via communication link 132 and control circuitry 150 of handheld device 126 can cause user interface 154 to display the transmitted data as, for example, text or one or more icons. Similarly, memory 162 can perform all the functions of memory 152. Memory 162 can, for example, store instructions that can be executed by control circuitry 160. Memory 162 can also store various icons and other information that can be transmitted to handheld device 126 and displayed by user interface 154.

Control circuitry 150 and 160 have substantially the same functionality, and some embodiments of spray monitoring system 110 lack one of control circuitry 150 or 160. Similarly, memory 152 and 162 have substantially the same function, and some embodiments of spray monitoring system 110 lack one of memory 152 or 162. In some examples, handheld device 126 and gateway 122 are integrated and/or attached to form a single device. In these examples, control circuitry 150 and 160 can be integrated to form a single set of control circuitry and/or memory 152 and 160 can be integrated to form a single memory.

Control circuitry 150, 160 can include one or more of a microprocessor, a controller, a digital signal processor (DSP), an application specific integrated circuit (ASIC), a field-programmable gate array (FPGA), or other equivalent discrete or integrated logic circuitry. Control circuitry 150, 160 can be entirely or partially mounted on one or more boards. In some examples, control circuitry 150, 160 can be implemented as a plurality of discrete circuitry subassemblies.

Memory 152, 162, in some examples, can be a computer-readable storage medium. In some examples, a computer-readable storage medium can include a non-transitory medium. The term "nontransitory" indicates that the storage medium is not embodied in a carrier wave or a propagated signal. In certain examples, a non-transitory storage medium can store data that can, over time, change (e.g., in RAM or cache). In some examples, memory 152, 162 can include temporary memory, meaning that a primary purpose of the computer-readable memory is not long-term storage. Memory 152, 162, in some examples, can be a volatile memory, meaning that the memory does not maintain stored contents when electrical power to the controller is removed. Examples of volatile memories include random access memory (RAM), dynamic random-access memory (DRAM), static random-access memory (SRAM), and other forms of volatile memory. In some examples, memory 152, 162 can be used to store program instructions for execution by one or more processors of the controller. For instance, memory 152, 162 can be used by software or applications executed by control circuitry 150, 160 to temporarily store information during program execution. In some examples, memory 152, 162 includes non-volatile storage elements. Examples of such non-volatile storage elements can include magnetic hard discs, optical discs, floppy discs, flash memory, or forms of electrically programmable memory (EPROM) or electrically erasable and programmable memory (EEPROM).

Spray monitoring system 110 enables monitoring of relevant spray parameters of spray system 10. Specifically, spray monitoring system 110 enables simultaneous monitoring of both pressure and flow rate at each spray nozzle 32, allowing the application density, droplet size, and other relevant derived parameters for each spray nozzle 32 to be generated.

Further, spray monitoring system 110 allows application density, droplet size, flow rate, and pressure to be known for each spray nozzle 32 in spray system 10. Each spray monitoring sensor 30 is individually identified to control circuitry 150, 160 through signal buses 120A, 120B and gateway 122. Because spray monitoring sensors 30 are individually identified, physical locations of spray nozzles 32 can be assigned to each spray monitoring sensor 30, allowing an operator to quickly identify which spray parameter information (e.g., pressure, flow rate, droplet size, or application density) corresponds to which spray nozzle 32 and, if necessary, perform maintenance on or replace spray nozzles 32 that are performing poorly. An operator can identify poorly performing spray nozzles 32 by comparing spray parameter data of spray nozzles 32 to each other and/or by comparing spray parameter data to ideal spray parameter values stored on, for example, memory 152, 162, and/or diagnostics database 128.

As used herein, "application density" refers to the volume of fluid sprayed per unit of area. For example, an application density can have a unit of gallons per acre. In some examples, application density may be referred to as an "application rate." Application density can be calculated for a given period of time using a velocity measured by velocity sensor 130 and a flowrate measured by a spray monitoring sensor 30. Specifically, the flowrate and the length of the time period give the number of gallons applied during the time period. Similarly, the velocity and the length of the time period yield the distance traveled by the spray nozzle during the time period. Information about the width of boom 22 or the width of the spray from the spray nozzle can be used with the distance to generate an area. The number of gallons applied during the time period and the area traveled for the time period yield the application density. The time period used to calculate application density can be the time period between measurements made by spray monitoring sensors 30 or velocity sensor 130, or can be another arbitrary number based on operator preference, application needs, or convenience. Control circuitry 150 can be configured to automatically generate the application density and cause user interface 154 to display the application density.

As used herein, "droplet size" refers to an average droplet size sprayed by a spray nozzle. Droplet size is determined based on the fluid pressure and physical characteristics of the spray nozzle, such as the size or shape of the spray nozzle. The droplet size at a given pressure for a given spray nozzle can be experimentally determined and stored in a lookup table. Control circuitry, such as control circuitry 150, 160, can then cross-reference the lookup table with the measured pressure to determine the droplet size for a given spray nozzle.

Droplet size can be displayed by user interface 154 as arbitrary text indicative of approximate droplet size to improve clarity to an operator, such that an operator does not need to visualize the size of the droplets to understand the type of spray produced by a spray nozzle. For example, droplet size can be represented as "fine" or "coarse." A droplet size represented as "fine" would be understood by an operator to have smaller droplets than a droplet size represented as "coarse." "Fine" and "coarse" are illustrative and non-limiting examples of arbitrary text, and any text can be used based on operator needs, trade application standards, and/or convenience. Where droplet size is represented as arbitrary text, the droplet size table can store the arbitrary text, such that cross-referencing the lookup table with a pressure value returns the appropriate arbitrary text for display by a user interface. Additionally and/or alternatively, numeric values representing a droplet parameter, such as droplet diameter, can be displayed as the droplet size. In these examples, the lookup table can store the numeric values such that cross-referencing the lookup table with a pressure value returns a numeric value that can be displayed by a user interface.

While fluid parameters such as pressure or flowrate are often those that can be directly adjusted by an operator of spray system 10, evaluating spray quality through a combination of application density and droplet size provides significant advantages.

Specifically, application density directly measures whether the correct amount of a fluid has been applied to a given land area. The amount of fluid applied to a given land area provides substantially more information than the flowrate, expressed as volume per unit of time, of the fluid. Underspraying a pesticide, for example, does not provide adequate pest protection to the sprayed crops. Conversely, overspraying can cause substantial material waste, increasing costs associated with spraying a given area. Further, overspraying of pesticides and herbicides can also lead to the development of pesticide- and herbicide-resistant organisms.

Spraying at the correct droplet size promotes even fluid application across an intended area. Spraying at too fine of a droplet size can cause spray drift, resulting in an uneven application that gives rise to local instances of overspraying and underspraying, even where the application density is otherwise appropriate. Spraying at too coarse of a droplet size can also result in uneven coverage and reduce total coverage by a given spray nozzle. To this extent, droplet size advantageously correlates to spray pattern uniformity. Pressure, conversely, does not provide a useful estimation of spray uniformity.

For the above reasons, application density and droplet size are advantageous metrics of spray quality. Notably, different fluids require different application densities and droplet sizes for optimal spray quality. The optimal application densities and droplet sizes are based on the chemical properties of the fluid sprayed. To this extent, a given spray system cannot be operated at the same pressures and flowrates for all potential sprayed fluids while producing a quality spray.

In some examples, the optimal application densities and droplet sizes can also be selected to minimize the total fluid sprayed while also ensuring that crop is adequately covered throughout the field.

Spray monitoring system 110 allows for application density and droplet size to be known for a variety of fluids by simultaneously measuring backpressure, flowrate, and spray nozzle velocity. An operator can adjust parameters of spray system 10 according to the information provided by spray monitoring system 110, improving spray quality of spray system 10.

Various GUIs for displaying data generated using spray monitoring system 110 are described herein that offer different advantages. Each GUI described herein can form a part of other GUIs or user interface described herein, such that each GUI or user interface forms a different level or virtual screen of a single user interface. For example, two or more of GUI 310 (FIG. 4), GUI 600 (FIG. 7), and GUI 700 (FIG. 8) can be combined to form a single user interface, with each individual GUI forming a different level or virtual screen of the user interface. Advantageously, this allows an operator to interact with a single user interface in order to display data obtained by spray monitoring system 110 in various ways based on operator preference or application needs. It can be particularly advantageous to combine various GUIs disclosed herein into a single user interface where spray monitoring system 110 is generating large amounts of data, such as embodiments of spray system 10 and spray monitoring system 110 having large numbers of spray nozzles 32 and spray monitoring sensors 30.

Comprehensive Monitoring System

Figure 4:
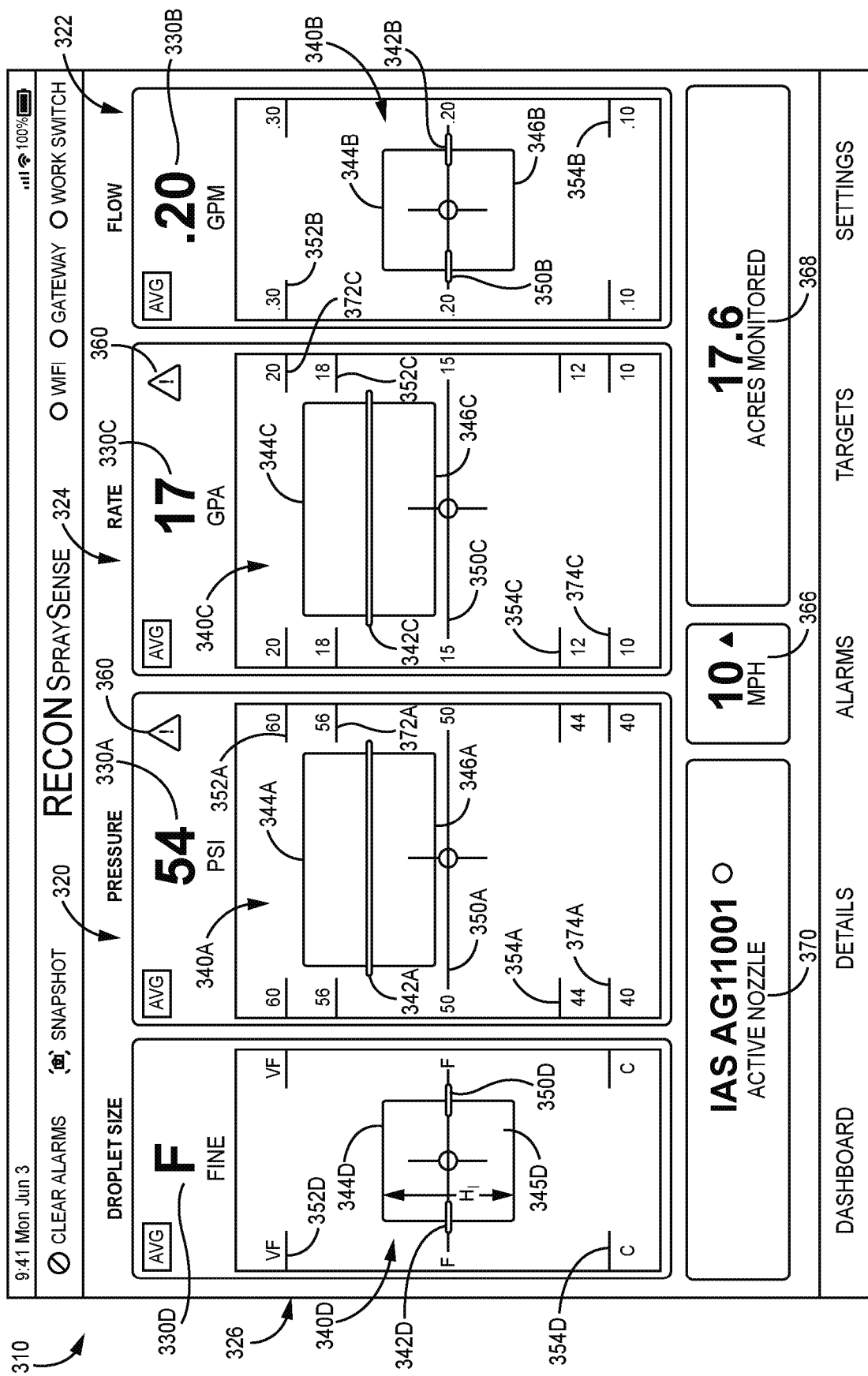
FIG. 4 is a schematic depiction of a graphical user interface (GUI) for representing spray system monitoring information.

FIG. 4 is a schematic diagram of GUI 310 for representing spray system monitoring information. GUI 310 includes system pressure region 320, system flow rate region 322, system application density region 324, system droplet size region 326, text information 330 (including 330A-D), bar icons 340 (including 340A-D), average lines 342 (including 342A-D), maximums 344 (including 344A-D), minimums 346 (including 346A-D), target value icons (including 350A-D), maximum threshold icons 352 (including 352A-D), minimum threshold icons 354 (including 354A-D), warning icon 360, velocity icon 366, spray area 368, nozzle icon 370, maximum threshold icons 372 (including 372A and 372C), minimum threshold icons 374 (including 374A and 374C), and height $H_I$.

GUI 310 can be displayed by a display of handheld device 126 (FIGS. 2-3) to convey system averages for various spray parameters generated by spray monitoring system 110 (FIGS. 1-3). A user can also interact with GUI 310 through a user interface device, such as handheld device 126. GUI 310 graphically presents average, maximum, and minimum spray parameter values for spray system 10. Advantageously, displaying system-wide average information allows an operator to quickly ascertain the overall spray quality produced by spray nozzles 32 (FIGS. 1-2), and displaying system-wide maximum and minimum information allows an operator to quickly ascertain the variation in spray quality of the spray produced by spray nozzles 32.

Most conventional spray systems do not include spray monitoring systems. Further, existing spray monitoring systems only provide raw and non-aggregate flow rate and pressure values. It is difficult for an operator to interpret raw and non-aggregate flow rate and pressure values and adjust a spray system to produce quality spray. Because existing spray monitoring systems do not provide application rate or droplet size information to an operator, an operator would also be required to manually transform raw, non-aggregate pressure and flow rate information into application rate and droplet size while simultaneously operating a spray system. GUI 310 and method 400 (FIG. 5) significantly simplify the display of spray parameter data to an operator and enable an operator to quickly determine average spray parameters and spray parameter variation for a spray system. In turn, this enables an operator to more easily adjust spray parameters and achieve a quality spray as compared to existing systems and methods.

System pressure region 320 displays condensed system-wide pressure information from spray monitoring sensors 30 as text information 330A and bar icon 340A overlaid on target value icon 350A, maximum threshold icons 352A/372A, and minimum threshold icons 354A/374A. System flow rate region 322 displays pressure information from spray monitoring sensors 30 as text information 330B and bar icon 340B overlaid on target value icon 350B, maximum threshold icons 352B/372B, and minimum threshold icons 354B/374B. System application density region 324 displays condensed system-wide application density information determined by control circuitry 150, 160 as text information 330C and bar icon 340C overlaid on target value icon 350C, maximum threshold icons 352C/372C, and minimum threshold icons 354C/374C. System droplet size region 326 displays condensed system-wide droplet information determined by control circuitry 150, 160 as text information 330D and bar icon 340D overlaid on target value icon 350D, maximum threshold icons 352D/372D, and minimum threshold icons 354D/374D.

Text information 330 represents the average value for a given spray parameter as text information. Control circuitry 150, 160 can determine the average of pressure, flow rate, application density, and droplet size across all spray nozzles 32 of spray system 10 and display that information as text information 330 in GUI 310. For example, text information 330A represents the average pressure measured by spray monitoring sensors 30. In the depicted embodiment, text information 330D in system droplet size region 326 includes the text "F" and "Fine" to indicate to an operator of the approximate droplet size across all spray nozzles 32. In other embodiments, text information 330D can include numeric values representing droplet size, such as an average droplet diameter, or can include illustrative graphical icons.

Each of bar icons 340 include average line 342, maximum 344, and minimum 346. Average line 342 represents a system-wide average of a spray parameter. To this extent, average line 342 represents the same value as text information 330. Maximum 344 represents the maximum value of the spray parameter and minimum 346 represents the lowest value. Control circuitry 150, 160 can determine the maximum value of all values determined for a given spray parameter using spray monitoring system 110 and display that value as maximum 344. Similarly, control circuitry 150, 160 can determine the minimum value of all values determined for a given spray parameter using spray monitoring system 110 and display that value as minimum 346. For example, maximum 344A represents the highest pressure value measured using spray monitoring sensors 30 and minimum 346A represents the lowest pressure value measured using spray monitoring sensors 30.

The bar icon 340 for each spray parameter is displayed relative to a target value icon 350, a maximum threshold icon 352, and a minimum threshold icon 354. The target value icon 350 represents a target parameter value for producing optimal spray. The maximum threshold icon 352 represents a maximum spray parameter value that produces optimal spray. The minimum threshold icon 354 represents a minimum spray parameter value that produces optimal spray. The maximum and minimum spray threshold values are pre-defined values that are based on the fluid being sprayed and/or operator preference. In this manner, maximum threshold icon 352 and minimum threshold icon 354 delineate a range of locations of bar icons 340 that correspond to acceptable spray parameter values.

GUI 310 displays a warning icon 360 to indicate that a maximum spray parameter value exceeds the maximum threshold or that a minimum spray parameter value is below a minimum threshold. The warning icon 360 is displayed proximate to other icons and information for the relevant spray parameter. For example, the depicted embodiment of GUI 310 displays warning icon 360 adjacent to text information 330 of system pressure region 320 to indicate that the maximum 344 for system pressure region 320 exceeds the maximum threshold.

GUI 310 also provides various diagnostic information that is not represented in system pressure region 320, system flow rate region 322, system application density region 324, and system droplet size region 326. For example, GUI 310 also displays a velocity icon 366 that depicts the current velocity of spray system 10 detected by velocity sensor 130. As described previously, fluid application density is based on the fluid flow rate and the velocity of spray nozzles 32. Therefore, if spray system 10 moves too fast or slow, suboptimal application densities can result. Control circuitry 150, 160 can compare the current velocity measured by velocity sensor 130 against a reference velocity and display the difference by updating the appearance of velocity icon 366. For example, current velocity icon 366 can be displayed in different colors or alongside additional icons to indicate to a user that the measured velocity is improper and should be adjusted to match the reference velocity. Control circuitry 150, 160 can be configured to automatically determine the reference velocity based on, for example, the spray nozzle or fluid type selected, or an operator can manually input the reference velocity.

GUI 310 can further provide relevant non-diagnostic information to a user, such as total area sprayed or the currently selected spray nozzle, among other options. In the depicted embodiment, GUI 310 depicts total sprayed area as spray area 368 and the currently selected spray nozzle as nozzle icon 370.

Spray area 368 depicts a text value of the total area sprayed by spray system 10 as measured using by spray monitoring system 110. The total spray area sprayed by the spray area is generally the product of the distance traveled by the spray system and the width $W_B$ of boom 22. As described previously, control circuitry 150, 160 (FIG. 3) can be configured to determine the distance traveled by the spray system over a given time period using the velocity measured by velocity sensor 130. The width $W_B$ of boom 22 can be used with the distance to determine the total area sprayed by spray system 10. The total area is depicted in text as spray area 368 in GUI 310.

Nozzle icon 370 displays text information describing the name, type, or other information describing the spray nozzle used by spray monitoring system 110 to generate droplet size. To this extent, nozzle icon 370 allows an operator to visually confirm that the correct spray nozzle is selected and that the information displayed as system droplet size region 326 is accurate.

Figure 5:
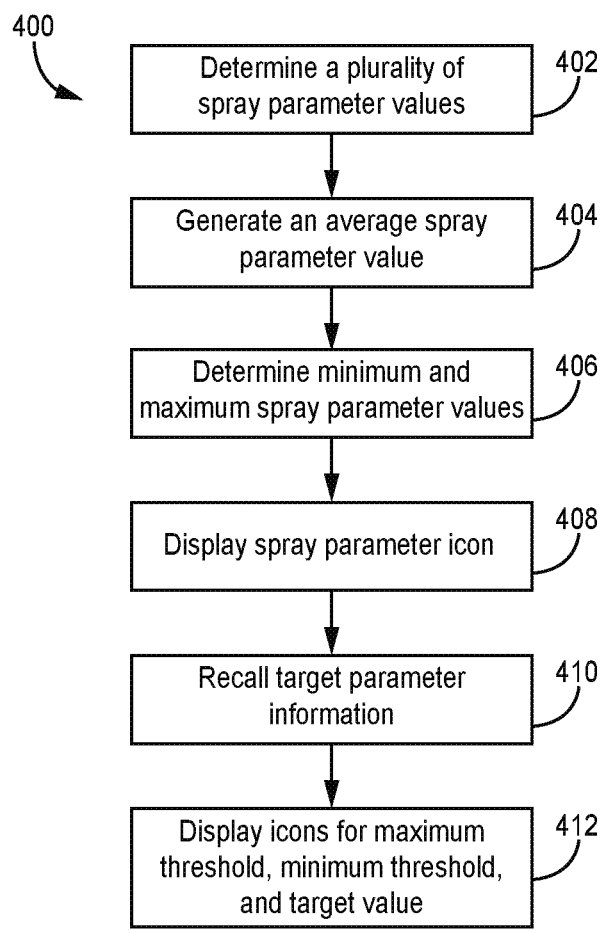
FIG. 5 is a flow diagram of a method of generating icons for display by the GUI depicted in FIG. 4.

FIG. 5 is a flow diagram of a method 400 of generating a spray parameter icon. Method 400 will be discussed in reference to GUI 310. Method 400 includes measuring a plurality of spray parameter values 402; generating an average spray parameter value 404; determining minimum and maximum spray parameter values 406; displaying a spray parameter icon representing the average, minimum, and maximum values 408; recalling target parameter information 410; and generating icons for the target value, minimum threshold, and maximum threshold 412.

In act 402, a plurality of spray parameter values are determined for a plurality of spray nozzles. The spray parameter can be any spray parameter described herein, such as pressure, flowrate, application density, or droplet size, or any other useful parameter for describing fluid spray. The spray parameter can be determined by, for example, spray monitoring system 110, and can be individually determined for each spray nozzle in a spray system. If the spray parameter is pressure or flow rate, the spray parameter can be directly measured for each spray nozzle using spray monitoring sensors 30. If the spray parameter is application density or droplet size, the spray parameter can be determined for each spray nozzle by control circuitry 150, 160 using pressure and/or flow rate data measured by spray monitoring sensors 30 and velocity data generated using velocity sensor 130. The spray parameter values are determined over the course of a given measurement period. The measurement period can be any selected length of time for generating and displaying icons representative of spray parameter information. For example, the measurement period can be the measurement interval of spray monitoring sensors 30 or can be the operational time of spray monitoring system 110.

In act 404, the spray parameter values measured in act 402 are averaged to create an average value. Specifically, all values determined for a single spray parameter (e.g., pressure, flow rate, application density, or droplet size) are averaged to create an average value. The average value can be generated by control circuitry 150, 160 and stored to memory 152, 162 for subsequent use with method 400.

In act 406, the minimum value and the maximum value of the plurality of spray parameter values are determined by spray monitoring system 110. The minimum is the lowest value of the spray parameter measurements. Control circuitry 150, 160 can be configured to determine the maximum and minimum among values determined in act 402 for a given measurement period and store the values to memory 152, 162 for subsequent use with method 400.

In act 408, a spray parameter icon is displayed. The spray parameter icon represents the average, minimum, and maximum determined in acts 404 and 406. For example, the spray parameter icon can be a bar icon 340 (FIG. 4). The spray parameter icon can be displayed by a user interface to convey information about the spray parameter to an operator.

In act 410, control circuitry recalls target parameter and threshold information from a memory. The target parameter and threshold information includes a target value, a maximum threshold, and a minimum threshold. The target value is an optimal value for the average determined in act 404. The maximum threshold is the maximum value of the maximum determined in act 406 that results in optimal spray. Similarly, the minimum threshold is the minimum value of the minimum determined in act 406 that results in optimal spray. Act 410 can be repeated to create multiple, different maximum and minimum values for a spray parameter, as described previously with respect to FIG. 4.

The target values for a given fluid can be stored on a memory, such as memory 152, 162 (FIG. 3), and used by control circuitry, such as control circuitry 150, 160 (FIG. 3), to determine the target value icon 350 that should be displayed in GUI 310. Control circuitry can automatically recall the target value for a given fluid based on operator input at handheld device 126. For some fluids, the stored target value may not yield optimal spray quality due to, for example, equipment needs or weather. In these circumstances, an operator can use user interface 154 to adjust the displayed target value icon 350. Further, the values can be set to be consistent across other GUI embodiments described herein, such as GUI 600 (FIG. 7) or GUI 700 (FIG. 8). Notably, having values set to be consistent across GUI embodiments allows each of GUI 310, GUI 600, and GUI 700 to function as separate virtual screens or levels of a single user interface displayed by handheld device 126 without requiring handheld device 126 to be separately configured for each GUI.

In act 412, a user interface displays a target value icon 350, a maximum threshold icon 352, and a minimum threshold icon 354, which represent the target value, minimum threshold, and maximum threshold, respectively. The target value icon 350, maximum threshold icon 352, and minimum threshold icon 354 are generated using the target value, maximum threshold, and minimum threshold information generated in act 410 by control circuitry 150, 160. The control circuitry 150, 160 can cause GUI 310 to display the target value icon 350, maximum threshold icon 352, and minimum threshold icon 354.

In some examples, it can be advantageous to display more than one maximum threshold icon 352 or minimum threshold icon 354 representative of successive maximum and minimum thresholds in order to increase the detail and granularity of the feedback provided by GUI 310. A value beyond a first, lower maximum threshold can indicate a relatively minor system or operator error, while a value outside of the second, greater maximum threshold can indicate a relative significant system or operator error. Similarly, a value below a first, higher minimum threshold can indicate a relatively minor system or operator error, while a value below the second, lower minimum threshold can indicate a relatively significant system or operator error. These separate thresholds can be depicted as separate icons for operator comparison with bar icons 340. Method 400 can be adapted to generate multiple maximum thresholds and multiple minimum thresholds. Specifically, multiple maximum and minimum thresholds can be generated in act 410. The information for the additional maximum and minimum thresholds can be stored on memory 152, 162 and recalled for use in act 412 by control circuitry 150, 160. The information recalled in act 410 can be used by control circuitry 150, 160 to generate lower maximum threshold icons 352, higher maximum threshold icons 372, higher minimum threshold icons 354, and lower minimum threshold icons 374, each of which can be displayed by GUI 310.

For example, in the embodiment of GUI 310 depicted in FIG. 4, system pressure region 320 includes two maximum threshold icons 352A and 372A, and two minimum threshold icons 354A and 374A. Maximum threshold icon 372A depicts a higher maximum threshold than maximum threshold icon 352A and minimum threshold icon 374A depicts a lower minimum threshold than minimum threshold icon 354A. In the depicted example, the maximum 344A for system pressure region 320 exceeds the first, lower maximum threshold represented by maximum threshold icon 352A but not the greater maximum threshold represented by maximum threshold icon 372a, indicating a relative minor system or operator error. As such, the bar icon 340A for system pressure region 320 extends past maximum threshold icon 352A but not the maximum threshold icon 372A. Maximum threshold icons 352A/372A and minimum threshold icons 354A/374A can have different shading to improve contrast and improve the ease with which an operator can interpret the information represented by maximum threshold icons 352A/372A and minimum threshold icons 354A/374A.

Similarly, system application density region 324 includes two different maximum threshold icons 352C and 372C, and two minimum threshold icons 354C and 374C.

GUI 310 depicts maximum threshold icons 352 and minimum threshold icons 354 as lines and text to illustrate the greatest value of maximum 344 and the lowest value of minimum 346 that creates optimal spray. The text can correspond to the numeric value of the maximum or minimum threshold represented by icons 352 and 354. Maximum threshold icons 352 and minimum threshold icons 354 can also have shading to increase contrast and clearly mark the acceptable range for bar icons 340, improving the ease with which an operator can interpret the values represented by GUI 310. However, maximum threshold icon 352 and minimum threshold icon 354 can have any selected shape for representing maximum and minimum threshold values for a spray parameter. GUI 310 depicts a bar icon 340 as extending past maximum threshold icon 352 where maximum 344 is greater than the maximum threshold value. GUI 310 likewise depicts bar icon 340 as extending past minimum threshold icon 354 where minimum 346 is lower than the minimum threshold value.

GUI 310 overlays the elements of bar icons 340 with target value icon 350, maximum threshold icon 352, and minimum threshold icon 354 so that, for a given spray parameter, an operator can understand the relative values of the average and the target value, the maximum and the maximum threshold, and the minimum threshold by visually comparing the displayed locations of a bar icon 340 with target value icon 350, maximum threshold icon 352, and minimum threshold icon 354.

As the values of the spray parameters measured using spray monitoring system 110 change, the positions and height of bar icons 340 (including average line 342, maximum 344, and minimum 346) are changed while the positions of target value icon 350, maximum threshold icon 352, and minimum threshold icon 354 remain static. An operator can improve spray quality by adjusting input parameters of spray system 10, such as flowrate, pressure, or vehicle velocity, until the average represented by average line 342 for each spray parameter displayed by GUI 310 is equal to the corresponding target value represented by target value icon 350. An operator can further improve spray quality by adjusting spray system 10 until the maximum 344 does not exceed the relevant maximum threshold represented by maximum threshold icon 352 and the minimum 346 is not below the relevant minimum threshold represented by maximum threshold icon 352 for each spray parameter. Further, as the height of a bar icon 340 corresponds to the difference between the corresponding maximum 344 and minimum 346 values, an operator can improve the uniformity of the spray by reducing the height $H_I$ of the bar icons 340.

GUI 310 depicts average line 342 as overlapping or aligned with target value icon 350 where the average spray parameter value is equal to the target value. An operator can improve spray quality by adjusting spray system 10 until average line 342 is aligned with or overlaps the depicted position of target value icon 350. Target value icon 350 is depicted as a crosshair for communicating to an operator that average line 342 of the bar icon 340 should be aligned with the target value icon 350. However, target value icon 350 can have any selected shape representing a target spray parameter value.

GUI 310 depicts maximum 344 of a bar icon 340 as extending past maximum threshold icon 352 when the maximum measured spray parameter value is greater than the pre-defined maximum threshold value. Similarly, GUI 310 depicts minimum 346 of a bar icon 340 as extending past minimum threshold icon 354 when the lowest measured spray parameter value is lower than the pre-defined minimum threshold value. An operator can also improve spray quality by adjusting spray system 10 until maximum 344 and minimum 346 of bar icons 340 do not extend past maximum threshold icons 352 and minimum threshold icons 354, respectively.

In the depicted example, system flow rate region 322 and system droplet size region 326 have averages 342B and 342D, respectively, that are aligned with their respective target value icons 350B and 350D. System pressure region 320 and system application density region 324 have averages 342A and 342C that are not aligned with their respective target value icons 350A and 350C, indicating that the averages of system pressure and system application density are not equal to the values represented by target value icons 3550 and 350C. Further, maximums 344A and 344C of system pressure region 320 and system application density region 324 extend past their respective maximum threshold icons 352A and 352C, indicating that the values represented by maximums 344A and 344C exceed the values represented by maximum thresholds 352A and 352C. The maximums 344B and 344D of system flow rate region 322 and system droplet size region 326 have maximums 344B and 344D that do not extend past their respective maximum threshold icons 352B and 352D, and further have minimums 346B and 346D that do not extend past their respective minimum threshold icons 354B and 354D. This, GUI 310 as depicted in FIG. 4 indicates that the maximums of system flow rate and system droplet size do not exceed the respective maximum thresholds for system flow rate and system droplet size, respectively. Similarly, GUI 310 indicates that the minimums of system flow rate and system droplet size are not below the minimum thresholds for system flow rate and system droplet size, respectively.

GUI 310 and method 400 provide significant advantages. An operator can optimize spray quality by adjusting the flow rate, pressure, application density, and droplet size of spray system 10 by observing the position and height of bar icons 340 displayed by GUI 310 and generated using method 400. Thus, GUI 310 and method 400 improve the ease and efficiency with which an operator can improve the spray quality of spray system 10.

Method 400 allows for the creation of simple icons that represent complex data sets in a manner that promotes easy visualization of both errors/faults and corresponding corrective actions, improving operator comprehension of the data produces by the spray monitoring system used. In particular, icons that represent the average, maximum, and minimum values of each spray parameter can be used to condense large amounts of spray parameter information, such as the type of data produced by spray monitoring system 110. Method 400 also allows the creation of icons representing target/threshold parameters, and further allows for those icons to be overlaid with the icons representing the average, maximum, and minimum values of the spray parameter. GUI 310 displays the icons generated using method 400. Method 400 provides visual feedback to an operator regarding whether a spray parameter should be adjusted. By comparing the bar icons 340 to the icons for the target/threshold parameters, minimums, and maximums, an operator can improve spray quality by adjusting the spray system until the displayed average is aligned with target value icon 350 and the displayed maximum 344 and minimum 346 values are, respectively, within the range shown by the displayed maximum threshold icon 352 and minimum threshold icon 354.

Spray Quality Score and User Interface with Spray Nozzle Groups

FIG. 6 is a flow diagram of a method 500 of generating a spray quality score. Method 500 includes acts 500-508, including determining application density and droplet size 502, determining the sprayed area 504, determine the total area sprayed accurately 506, and generating a spray quality score 508. As used herein, a "spray quality score" is a numeric indicator of the portion of a sprayed area over which relevant spray parameters are on target. Spray quality score condenses data for various spray parameters related to spray quality (e.g., application density or droplet size) into a single value that can be used by an operator to quickly evaluate the overall spray quality of sprayed fluid, and thereby identify whether corrective action is needed.

In act 502, the application density and droplet size of a sprayed fluid are determined for each spray nozzle in a spray system. The application density and droplet size are determined over an arbitrary measurement time. For example, the application density and droplet size can be determined based on measurements that are taken every 0.5, 1, or 2 seconds. The measurement time can be based on, for example, sensor hardware limits or operator preference. As described previously with respect to FIGS. 2-3, the application density and droplet size are determined by, for example, measuring a flowrate and pressure of a fluid flowing through a spray nozzle, and a velocity at which a spray nozzle is moving in order to generate application density and droplet size information. Flowrate, pressure, and velocity information can be measured over the measurement period and used to generate application density and droplet size information for the measurement period.

Further, the application density and droplet size can be measured for a plurality of spray nozzles in a spray system. Control circuitry can be configured to generate a spray quality score for each spray nozzle in the spray system. The application density and droplet size can be stored in a memory, such as memory 152, 162 (FIG. 3), and used in act 506 of method 500. Act 502 can be performed for all spray nozzles in the spray system to determine application density and droplet size information for each spray nozzle.

In act 504, the total area sprayed is determined. The distance traveled by each spray nozzle is measured for the period of time over which application density and droplet size are measured in act 502. Distance can be determined by, for example, measuring the velocity of the spray nozzle over the measurement period used in act 502. As described previously with respect to FIG. 2, spray nozzles are generally attached to a fixed structure of vehicle 20 such that a single velocity sensor can be used to determine the velocity of all spray nozzles in a given spray system. Consequently, the same travel distance can be assigned to each spray nozzle in the spray system. The measured distance can be stored in a memory, such as memory 150A/150B (FIG. 3), and used in other acts of method 500. Act 504 can be performed substantially simultaneously with act 502, such that the distance measured in act 504 can be used to determine the application density in act 502 and the total area sprayed in act 504. Further, performing acts 502 and 504 simultaneously allows control circuitry to simultaneously monitor droplet size, monitor application density, and measured distance traveled by each spray nozzle.

In act 506, the measured values of application density and droplet size determined in act 502 are compared against stored target application density and droplet size values. Similar to the discussion of target values with respect to FIGS. 4-5, the on-target values can be stored on a memory and recalled for use with method 500. Additionally and/or alternatively, an operator can manually enter the on-target values. Control circuitry, such as control circuitry 150, 160 (FIG. 3), can be configured to automatically compare the values for application density and droplet size against the stored target values. Control circuitry can store whether a spray nozzle had on-target application density and droplet size values during the measurement time period (act 502) on a memory, such as memory 152A/152B (FIG. 3), for subsequent use in method 500.

In act 508, a spray quality score is generated. The spray quality score represents the percentage of the area for which the application density and droplet size were on-target. Because the total area covered is proportional to the distance traveled in the measurement period, the percentage of area for which the application density and droplet size were on-target is equal to the percentage of the distance traveled (as measured in act 504) for which the application density and droplet size were on-target. The total on-target distance can be obtained by multiplying a number of on-target spray nozzles determined in act 506 by the distance determined in act 504. The total distance can be obtained by multiplying the distance determined in act 504 by the total number of spray nozzles. The quotient of the total on-target distance and the total distance yields the spray quality score. The spray quality score can be displayed on a user interface device to communicate the overall spray quality during the measurement period to an operator.

Method 500 can be repeated as fluid is sprayed over an entire parcel or area of land and used to generate additional on-target distance and total distance values in additional iterations of method 500. The additional on-target distance and total distance values can be added to previous values to create a new spray quality score reflective of the total area sprayed at the end of an iteration of method 500. In this manner, the spray quality score displayed to an operator can be updated in real time to improve the operator's understanding of the overall quality of the fluid spray produced by the spray system. The spray quality score data can also be stored for each measurement time for later diagnostic use.

Method 500 provides significant advantages. In particular, the spray quality score generated by method 500 condenses multiple separate metrics into a single, simple value that can be used by an operator to quickly assess the spray quality of a spray system. Further, method 500 produces a spray quality score as a percentage value that varies between 0 and 100%, increasing the efficiency with which an operator can use the spray quality score to assess spray quality.

Although method 500 is described as using application density and droplet size to generate a spray quality score, method 500 can be adapted to use any selected spray parameter to generate a spray quality score in addition to or in place of application density or droplet size. For example, the height of the spray nozzle can also provide information about spray quality for incorporation into a spray quality score. The height can be measured by, for example, a time-of-flight sensor or another method at the same time as acts 502 and 504 and compared against a target height in act 506. The percentage of the distance in which the height is on-target can be used in addition to application density and droplet size to generate the spray quality score in act 508. In the same manner, flowrate, pressure, or any other similar parameter can also be incorporated into the spray quality score.

Figure 7:
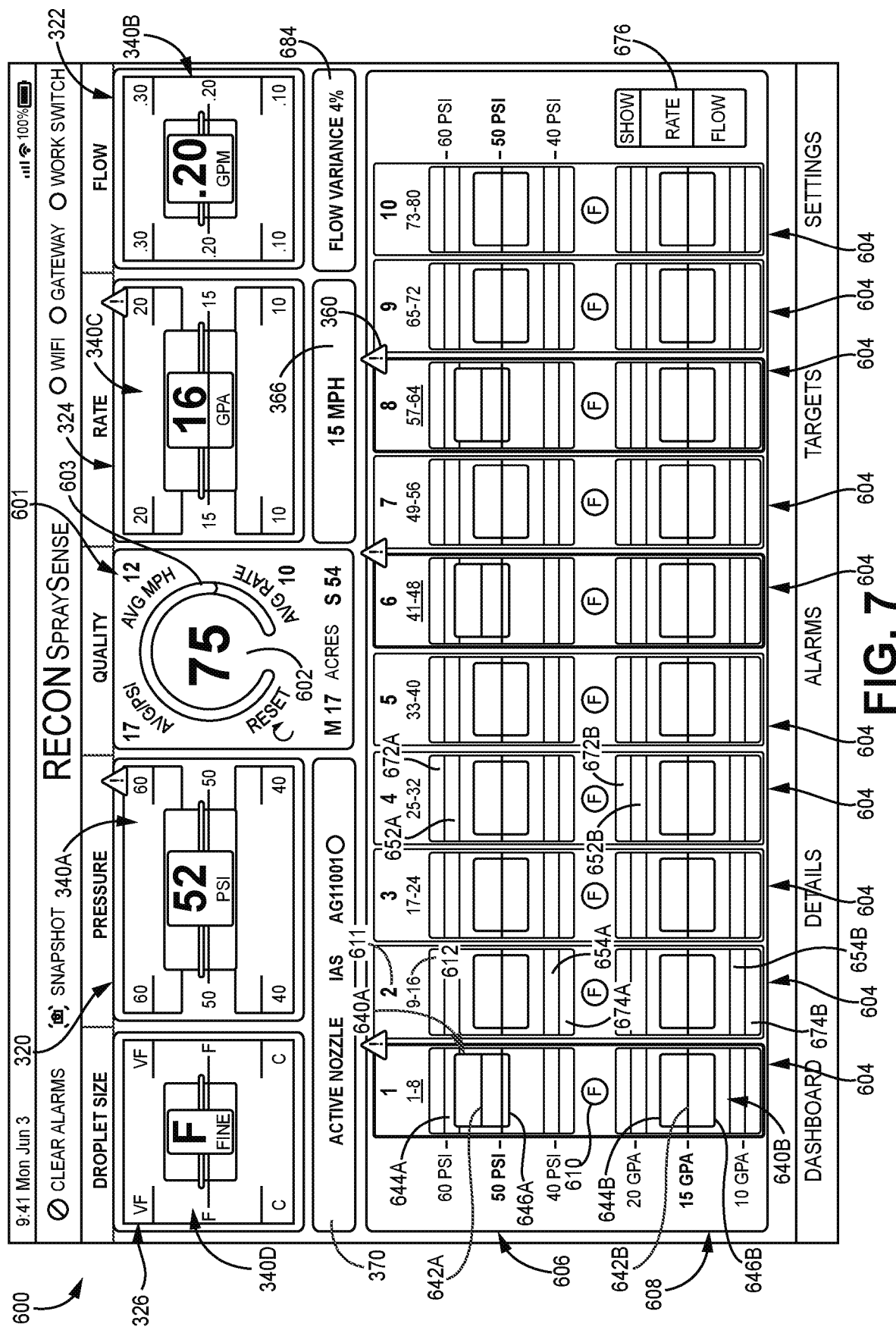
FIG. 7 is a schematic depiction of another GUI for representing spray system monitoring information and for displaying a spray quality score.
Figure 8:
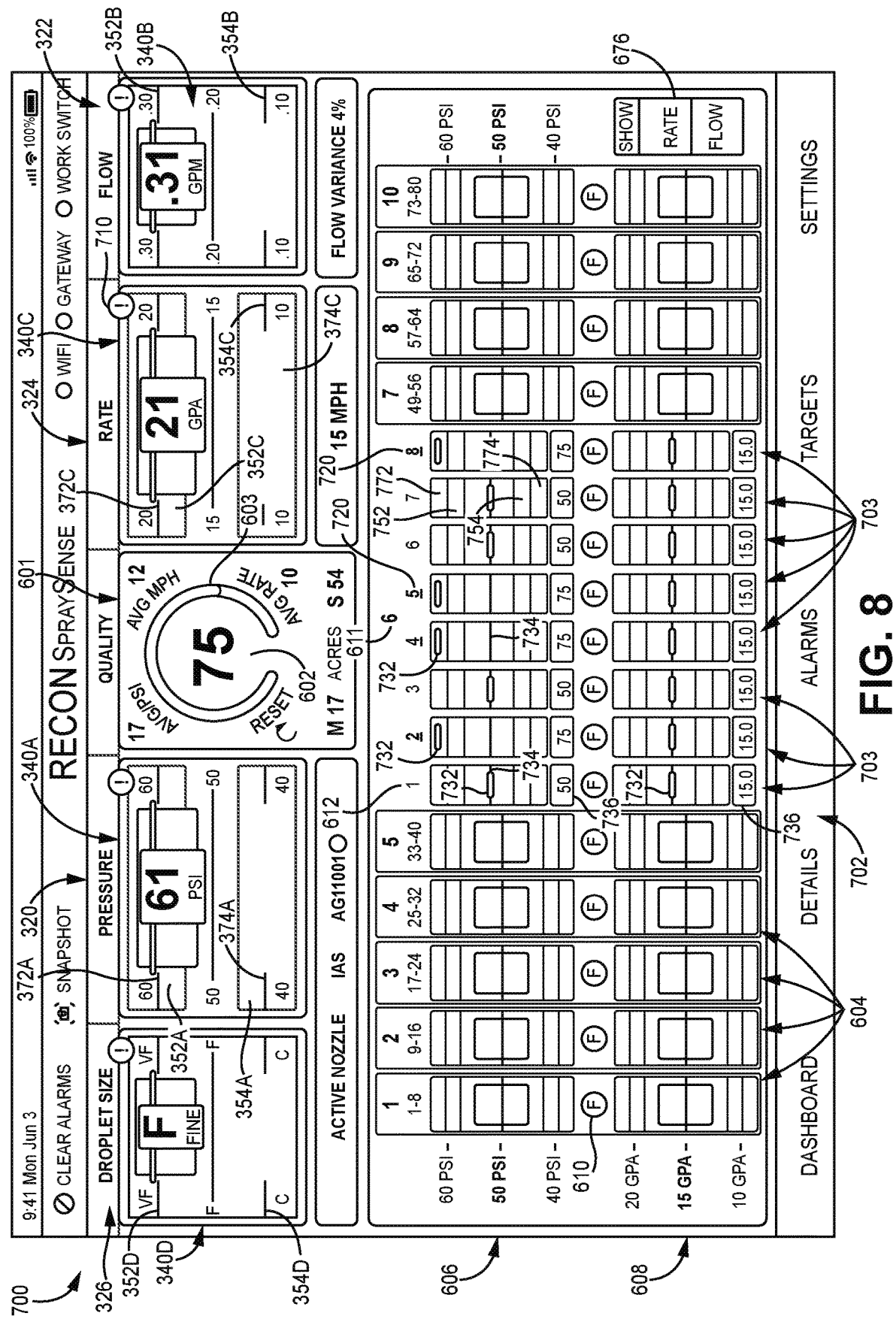
FIG. 8 is a schematic depiction of yet another GUI for representing spray system monitoring information.

FIG. 7 is a schematic diagram of GUI 600 for representing spray system monitoring information and for displaying a spray quality score. GUI 600 includes spray quality region 601, text information 602, spray quality icon 603, spray nozzle group display regions 604, pressure region 606, application density region 608, droplet size icons 610, spray nozzle group numbers 611, spray nozzle numbers 612, bar icons 640 (including average lines 642, maximums 644, and minimums 646), target value icons 650, first maximum threshold icons 652, first minimum threshold icons 654, second maximum threshold icons 672, second minimum threshold icons 674, selection icon 676, and flow variance 684. GUI 600 also includes system pressure region 320, system flow rate region 322, system application density region 324, system droplet size region 326, bar icons 340 (including 340A-D), current velocity icon 366, and nozzle icon 370, as described previously with respect to FIG. 4.

GUI 600 can be displayed by a user interface and a user can interact with GUI 600 through the user interface. In GUI 600, a spray quality score is displayed as text information 602 and spray quality icon 603. Text information 602 gives the numeric value of the spray quality score. In the depicted example, text information 602 displays the spray quality score as an integer to improve clarity and operator understanding, but text information 602 can also display the spray quality score as a non-integer value.

Spray quality region 601 displays spray quality score information and includes text information 602 and spray quality icon 603. Spray quality icon 603 is an arc-shaped percentage bar that graphically represents the value of the spray quality score. GUI 600 can vary the amount that the percentage bar is filled to be proportional with the percentage value of the spray quality score. Though spray quality icon 603 is shown as an arc-shaped percentage bar, it can take any selected shape for displaying spray quality information. For example, spray quality icon 603 can also be a linear percentage bar, a circular progress bar, or a percentage circle chart. Advantageously, displaying the spray quality score as a visual icon resembling a progress bar rather than as text alone improves the ease with which an operator can understand the information conveyed by the spray quality score at a glance. Rather than interpret a series of numbers reflecting spray performance across a large number of individual nozzles or groups of nozzles, an operator can simply view the aggregate characteristics of sprayer performance as represented via a percentage of spray quality icon 603 that is filled to determine whether the spray system is operating optimally, with GUI 600 indicating out-of-bounds behavior likely to result in faults or poor spray quality.

As discussed herein, spray nozzle groups include spray nozzles that are physically adjacent or proximate on boom 22. Each spray monitoring sensor 30 (FIGS. 1-3) can provide an identifier that is sent with pressure and flow rate data to gateway 122 and received by control circuitry 150, 160, and each identifier (and therefore each spray monitoring sensor 30) can be correlated to a physical location on boom 22. The physical locations of each spray monitoring sensor 30 can be stored in memory 152, 162 and used by control circuitry 150, 160 to define spray nozzle groups of physically adjacent or proximate spray nozzles. Because spray system 10 can include large numbers of spray nozzles, aggregating individual spray nozzle data into spray nozzle groups allows for an intermediate level of granularity, improving operator readability and usability over displays showing information for all spray nozzles on spray system 10 simultaneously, while providing increased detail over the simplified information presented in GUI 310 (FIG. 4).

Each spray nozzle group display region 604 displays spray parameter information for a single spray nozzle group. For each spray nozzle group display region 604, GUI 600 also displays spray nozzle group number 611 and spray nozzle numbers 612. Spray nozzle group number 611 is a unique number assigned to each spray nozzle group for identification purposes. Similarly, spray nozzle numbers 612 are unique numbers assigned to each spray nozzle 32 for identification purposes. The values displayed by spray nozzle group numbers 611 and spray nozzle numbers 612 are based on the physical locations of each corresponding spray nozzle group and spray nozzle 32. The depicted example of GUI 600 uses numbers for spray nozzle group numbers 611 and spray nozzle numbers 612 that increase sequentially in a linear direction along boom 22. Assigning sequential numbers to a linear arrangement of the physical locations of spray nozzles 32 allows an operator to use the numbers displayed as spray nozzle group number 611 and spray nozzle number 612 to quickly determine which spray nozzle 32 corresponds to the data displayed in GUI 600.

GUI 600 includes bar icons 640, as average line 642, maximum 644, and minimum 646 for each spray nozzle group. Bar icons 640 are substantially similar to bar icons 340, but display information aggregated for individual spray groups rather than system-wide information. In the example shown in FIG. 7, bar icons 640 in each spray nozzle group display region 604 have substantially the same height, indicating the same variation in spray parameters for each spray nozzle group. However, in other examples, spray parameter variation can be different across each spray nozzle group and, accordingly, the height of bar icons 640 in each spray nozzle group display region 604 can vary.

GUI 600 overlays the spray group bar icons 640 over target value icon 650, first maximum threshold icon 652, second maximum threshold icon 672, first minimum threshold icon 654, and second minimum threshold icon 674 for each spray nozzle group display region 604. Target value icon 650, first maximum threshold icon 652, second maximum threshold icon 672, first minimum threshold icon 654, and second minimum threshold icon 674 are substantially similar to target value icon 350, first maximum threshold icon 352, second maximum threshold icon 372, first minimum threshold icon 354, and second minimum threshold icon 374, respectively, as discussed previously with respect to GUI 310 (FIG. 4). Accordingly, the values represented by target value icon 650, first maximum threshold icon 652, second maximum threshold icon 672, first minimum threshold icon 654, and second minimum threshold icon 674 in GUI 600 can be identical to the values represented by target value icon 350, first maximum threshold icon 352, second maximum threshold icon 372, first minimum threshold icon 354, and second minimum threshold icon 374 in GUI 310, respectively. As described previously with respect to bar icons 340 of GUI 310, bar icons 640 provide a visual indication of the spray quality for a given spray nozzle group.

Spray pressure region 606, application density region 608, and droplet size icon 610 display aggregate pressure, application density, and droplet size, respectively, for each spray nozzle group. Spray pressure region 606 includes bar icons 640A to represent aggregated pressure measurements for each spray group. Bar icons 640A are overlaid over target value icons 650A, first maximum threshold icons 652A, first minimum threshold icons 654A, second maximum threshold icons 672A, and second minimum threshold icons 674A to allow an operator to quickly visually compare the pressure measured by spray monitoring system 110 with pressure target values and thresholds. Application density region 608 includes bar icons 640B to represent aggregated pressure measurements for each spray group. Bar icons 640B are overlaid over target value icons 650B, first maximum threshold icons 652B, first minimum threshold icons 654B, second maximum threshold icons 672B, and second minimum threshold icons 674B to allow an operator to quickly visually compare the pressure measured by spray monitoring system 110 with pressure target values and thresholds.

Droplet size icon 610 provides a graphical representation of the average droplet size for each spray nozzle group display region 604. Specifically, droplet size icon 610 provides a text representation of droplet size. In GUI 600, droplet size icon 610 uses text to convey droplet size, but it should be understood that any selected icon for conveying droplet size can be used as droplet size icon 610. Further, GUI 600 can vary the appearance of droplet size icon 610 to indicate whether the droplet size for a spray nozzle group is on-target. For example, the color and/or opacity of droplet size icon 610 can be varied to indicate whether droplet size for a spray nozzle group is on-target.

An operator can interact with selection icon 676 to select whether GUI 600 should display application density region 608 or should display a flow rate region containing aggregate flow rate data for each spray group. The aggregate flow rate data can be displayed using bar icons 640 and can be overlaid on target icons 650, maximum threshold icons 652/672, and minimum threshold icons 654/674 to allow an operator to quickly visually compare the measured flow rate with pressure targets and thresholds. In this manner, GUI 600 allows an operator to quickly and intuitively ascertain the location and severity of any performance anomalies or errors among a large number of nozzles through partial aggregation of nozzle parameters into nozzle groups, while retaining GUI indicators to allow identification anomalous behavior of individual nozzles.

GUI 600 also displays flow variance 684, which displays text information representing the percent variance of the fluid flow rate over the operational time of the spray monitoring system generating the data displayed by GUI 600. An operator can use the information displayed by flow variance 684 to diagnose errors or faults in spray system 10.

User Interface with Persistent Alarms

FIG. 8 is a schematic diagram of GUI 700 for representing spray system monitoring information. GUI 700 contains substantially the same icons and information as GUI 600 but also includes expanded view 702 of one spray nozzle group, spray nozzle regions 703, alarms icons 710, persistent alarm icons 720, line icons 732, centerlines 734, text values 736, maximum threshold icons 752, minimum threshold icons 754, maximum threshold icons 772, and minimum threshold icons 774. GUI 700 includes system pressure region 320, system flow rate region 322, system application density region 324, system droplet size region 326, bar icons 340, maximum threshold icons 352, minimum threshold icons 354, warning icons 360, current velocity icon 366, nozzle icon 370, maximum threshold icons 372, and minimum threshold icons, as described previously with respect to FIG. 4. Further, GUI 700 shows spray nozzle group display regions 604, pressure region 606, application density region 608, spray nozzle group numbers 611, individual nozzle numbers 612, and selection icon 676, as described previously with respect to FIG. 7.

GUI 700 can be displayed by a user interface, and a user can interact with GUI 700 through the user interface. Persistent alarm icons 720 are displayed by GUI 700 after the spray system is no longer spraying fluid and transient spray alarms are no longer active, enabling an operator to view spray quality errors after the operator is no longer operating the spray system and, further, eliminating the need for an operator to interpret complex log files to diagnose errors while the spray system is in an idle state.

Expanded view 702 shows individual spray nozzle regions 703, which represent spray parameter data for individual spray nozzles in a spray nozzle group. Expanded view 702 shows pressure data in pressure region 606 of each individual spray nozzle region 703 and application density data in application density region 608 of each individual spray nozzle region 703. As such, expanded view 702 does not aggregate data from multiple spray nozzles and therefore does not include bar icons 640 with average line 642, maximum 644, or minimum 646 elements. An operator can interact with GUI 700 to cause GUI 700 to display expanded view 702 or to cause GUI 700 to stop displaying expanded view 702 and instead resume displaying bar icons 640 (including average line 642, maximum 644, and minimum 646) for each spray nozzle group.

Individual nozzle numbers 612 are displayed for each spray nozzle in the expanded spray nozzle group shown in expanded view 702, allowing an operator to easily correlate data shown in GUI 700 to individual spray nozzles along boom 22 (FIGS. 1-2). In the depicted example, data for the spray nozzle group with spray nozzle group number 611 of "6" is depicted in expanded view 702 to show individual spray nozzle 32 information. In the embodiment of GUI 700 (FIG. 8), the individual spray nozzles in expanded view 702 have spray nozzle numbers 612 that indicate the relative position of each spray monitoring sensor 30 within the nozzle group and range from "1" to "8." In other embodiments of GUI 700, spray nozzle number 612 can depict values representative of the absolute position of each spray monitoring sensor in in expanded view 702.

Expanded view 702 includes line icon 732, centerline 734, and text value 736. Text value 736 displays the numeric value of the spray parameter as text. Centerline 734 represents a target value for the relevant spray parameter, and line icon 732 represents the measured value of the spray parameter. If line icon 732 and centerline 734 are aligned, the spray parameter is equal to its target value. Thus, centerline 734 functions similar to target icon 350 shown in FIG. 4.

Expanded view 702 of GUI 700 also includes maximum threshold icons 752 and 772. Maximum threshold icons 752 and 772 are substantially similar to maximum threshold icons 352/372 and 652/672 in FIGS. 4 and 7, respectively. Accordingly, the values represented by first maximum threshold icon 652 and second maximum threshold icon 672 can be identical to the values represented by maximum threshold icons 352/652 and maximum threshold icons 372/672, respectively.

Expanded view 702 further includes minimum threshold icons 754 and 774. Minimum threshold icons 754 and 774 are substantially similar to minimum threshold icons 354/374 and 654/674 in FIGS. 4 and 7, respectively. The values represented first maximum threshold icon 652 and second maximum threshold icon 672 can be identical to the values represented by maximum threshold icons 352/652 and maximum threshold icons 372/672, respectively.

As described previously, using consistent values across different GUI embodiments described herein allows for data collected by spray monitoring system 110 to be represented multiple ways and for each GUI to act as a virtual screen or level of a single user interface without requiring each GUI embodiment to be separately configured.

An operator can interact with selection icon 676 to cause GUI 700 to stop displaying application density information in application density region 608 and instead cause GUI 700 to display flow rate information in a flow rate region for each spray nozzle group display region 604 and each individual spray nozzle region 703.

Advantageously, expanded view 702 allows an operator to selectively view more detailed information than is presented by the aggregated values shown in system pressure region 320, system flow rate region 322, system application density region 324, system droplet size region 326, and spray nozzle group display regions 604. For example, an operator may observe a nozzle group pressure or a nozzle group application density outside a relevant minimum or maximum threshold. An operator can then interact with GUI 700 to show expanded view 702 and determine which spray nozzles within the spray nozzle group are off-target. Because each nozzle shown in GUI 700 is individually identified and numbered, the operator can use the individual spray nozzle information shown in expanded view 702 to identify and, if necessary, perform maintenance on or replace the poorly performing spray nozzles. Because spray nozzle numbers 612 for each spray nozzle increase sequentially in a linear direction along boom 22, an operator can correlate individual spray nozzles with data shown in expanded view 702 based on the spray nozzle number 612 displayed in expanded view 702. The combination of GUI elements presented herein allow an operator to identify nozzle groups of interest via GUI 600, and to access more granular information about specific nozzle performance via GUI 700 based upon that identification.

Alarm icons 710 are displayed next to bar icons 340 or 640 for a spray parameter and indicate that maximum for the spray parameter exceeds the highest maximum threshold for that spray parameter, as represented by maximum threshold icons 372 or 672, respectively. Warning icons 360 (FIGS. 4 and 7), can also be displayed next to bar icons 340 or 640 and indicate that maximum for the spray parameter exceeds the lower, first maximum threshold represented by maximum threshold icons 352 and 652, respectively. Alarm icons 710 indicate a more serious error than warning icons 360 shown by GUI 310 (see FIG. 4). The degree of deviation of a spray parameter indicated by an alarm icon 710 can indicate, for example, a clog or another serious problem with a spray nozzle 32 or group of spray nozzles 32. While warning icons 360 are described with respect to GUI 310 and alarm icons 710 are described with respect to GUI 700, warning icons 360 and alarm icons 710 can be shown by any of GUIs 310, 600, or 700 to indicate varying degrees of spray quality errors.

Warning icon 360 and alarm icon 710 are only displayed when a spray parameter maximum, minimum, or average value exceeds a maximum threshold value. When the relevant spray parameter has returned to an optimal value, warning icon 360 and/or alarm icon 710 are no longer displayed. Further, spray monitoring system 110 can continue collecting pressure, flow rate, droplet size, and application density information while spray system 10 is inactive. Because pressure, flow rate, droplet size, and application density generally have zero values when spray system 10 is inactive, they are below their respective maximum threshold values and warning icons 360 and alarm icons 710 do not display when spray system 10 is inactive. Warning icons 360 and alarm icons 710 represent transient alarms that are not shown by GUI 700 when the error state is no longer occurring.

If a spray parameter of an individual spray nozzle 32 exceeds a maximum threshold, GUI 700 can display a persistent alarm icon 720 instead of line icon 732 for that nozzle in expanded view 702 for a spray nozzle group display region 604. As used herein, a "persistent alarm icon" refers to an icon that continues to indicate an alarm or error state to an operator, including after the relevant spray parameter no longer is above a maximum threshold value. In the depicted example, persistent alarm icons 720 are shown for the nozzles with nozzle numbers 612 of "2," "4," "5," and "8." The persistent alarm icons 720 indicate that the relevant spray parameter exceeds a maximum threshold during operation of the spray system. The maximum threshold can be a first, lower maximum threshold represented by maximum threshold icon 752 or a second, greater maximum threshold represented by maximum threshold icon 772.

Persistent alarm icons 720 are displayed in GUI 700 until an operator interacts with GUI 700 that indicates that the persistent alarm icon 720 should no longer be displayed. Persistent alarm icons 720 can be accompanied by color changes of icons and font changes of text displayed in GUI 700. In some examples, multiple varieties of persistent alarm icons 720 can exist. For example, different icons shapes, styles, or colors can be used to indicate that a spray parameter for a spray nozzle 32 has exceeded a first, lower maximum threshold or a second, higher maximum threshold. These different persistent alarm icons 720 can be shown simultaneously in GUI 700.

Advantageously, persistent alarm icons 720 allow a user to efficiently evaluate potential errors or equipment issues with the spray system after the spray system is no longer operating and both warning icons 360 and alarm icons 710 are no longer displayed. Notably, some errors are transient and, consequently, an operator may not notice GUI 700 is displaying a warning icon 360 or alarm icon 710 corresponding to a transient error. Persistent alarm icons 720 advantageously function as a record of transient alarm conditions, allowing an operator to notice the persistent alarm icons 720 after the transient error has disappeared. Further, attempting to diagnose and understand an error condition indicated by a warning icon 360 or alarm icon 710 during operation of a spray system 10 can cause operators to make errors in the operation of the spray system 10. Persistent alarm icons 720 allow an operator to focus on operation of the spray system 10 while it is active and diagnose errors during inactive periods.

Notably, conventional systems require an operator to manually inspect logs and other text documents to identify errors that were not noticed during operation. However, manual inspection of logs can be time-intensive and difficult, particularly as a task to be performed while operating spraying equipment. Advantageously, persistent alarm icons 720 allow an operator to identify and understand the type and location of errors that occurred during a previous active period by interacting with GUI 700, improving the efficiency with which an operator can identify, diagnose, and correct errors.

While persistent alarm icons 720 have been generally described herein as being displayed in expanded view 702 of GUI 700 for individual spray nozzles 32, persistent alarm icons can also be displayed for spray nozzle groups of individual spray nozzle group display regions 604 or for the system average values displayed in GUI 310.

Further, while warning icons 360, alarm icons 710, and persistent alarm icons 720 have been described herein as displayed by one of GUI 310, GUI 600, or GUI 700 when a maximum exceeds a maximum threshold, warning icons 360, alarm icons 710, and persistent alarm icons 720 can also be displayed when a minimum is lower than a minimum threshold. For example, a warning icon 360 can be shown adjacent to bar icons 340/640 when a minimum is below the first minimum threshold represented by minimum threshold icons 354 and 654, respectively. Similarly, an alarm icon 710 can be shown adjacent to bar icons 340/640 when a minimum is lower than a second minimum threshold represented by minimum threshold icons 374 and 674, respectively. A persistent alarm icon 720 can be shown in an expanded view 702 to record that a spray parameter of an individual spray nozzle fell below one of minimum thresholds 752/772.

Figure 9:
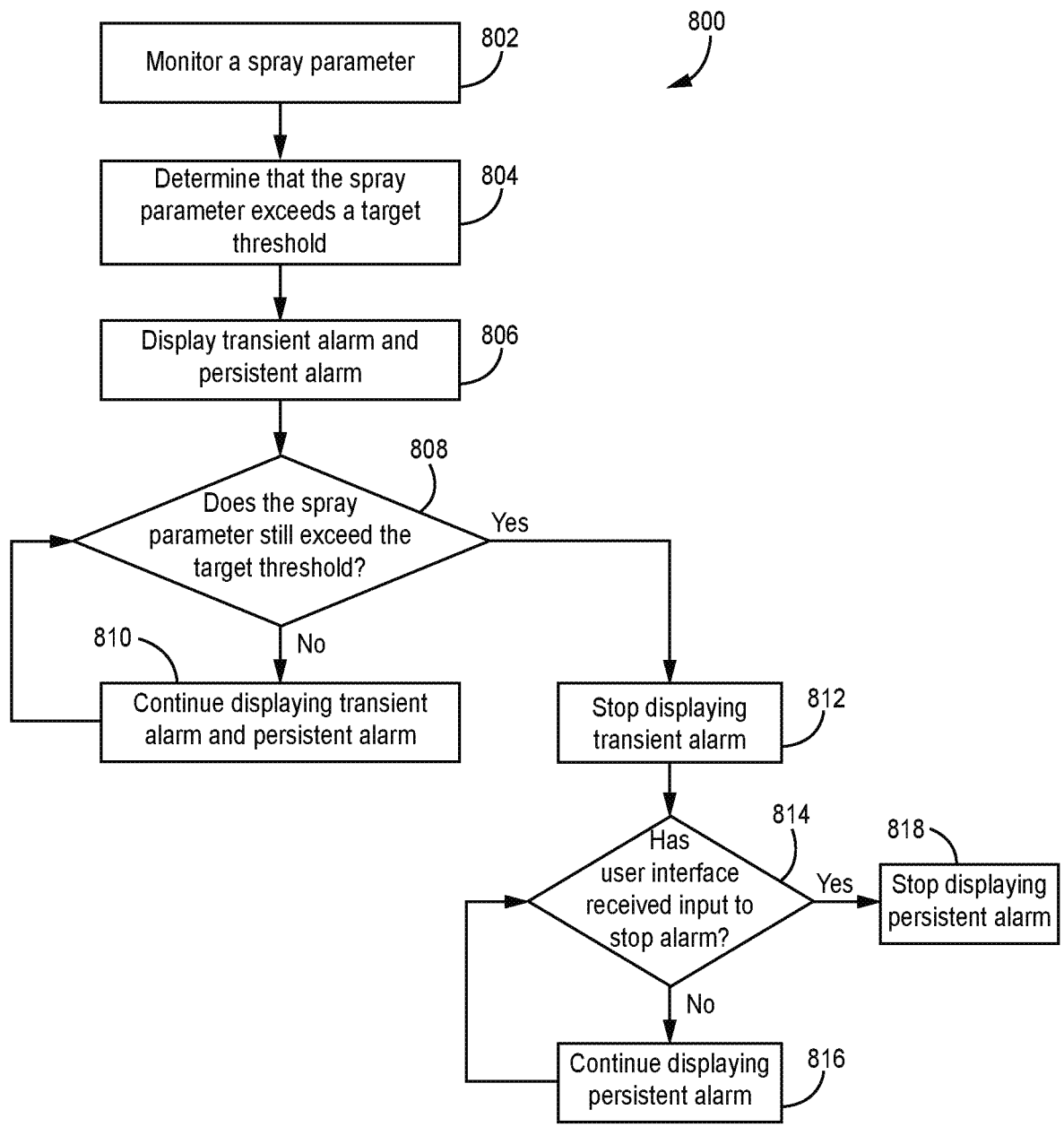
FIG. 9 is a flow diagram for a method of generating alarms for display by the GUI depicted in FIG. 8.

FIG. 9 is a flow diagram of method 800, which is a method of generating alarms for display by a user interface, such as GUI 700 (FIG. 8). In act 802, a spray parameter is monitored. The spray parameter can be any spray parameter described herein, such as pressure, flowrate, application density, or droplet size, or any other spray parameter useful for diagnosing spray system errors. Control circuitry can use a spray monitoring system, such as spray monitoring system 110 (FIG. 2) to monitor the spray parameter.

In act 804, control circuitry detects that a monitored spray parameter exceeds a target threshold. The target threshold is the largest value of the spray parameter that yields optimal spray characteristic. For example, the target threshold can be a maximum threshold value. Exceeding the target threshold indicates that there is a spray quality error related to the monitored spray parameter.

In act 806, persistent and transient alarms are displayed. The transient and persistent alarms can be displayed by a user interface and can include text or one or more icons. For example, the persistent alarm can be a persistent alarm icon 720 (FIG. 8) and the transient alarm can be warning icon 360 (FIG. 4) or alarm icon 710 (FIG. 8). Control circuitry can be automatically configured to cause the user interface to display the alarm after it detects that a monitored spray parameter has exceeded the target threshold.

In act 808, control circuitry determines whether the spray parameter continues to exceed the target threshold. Control circuitry can continuously monitor the spray parameter to determine whether the spray parameter still exceeds the target threshold. If the spray parameter is greater than the target threshold, then method 800 proceeds to act 810. In act 810, the user interface continues to display both the transient alarm and the persistent alarm. After act 810, act 808 is repeated to determine whether the spray parameter has subsequently fallen below the target threshold. Acts 808 and 810 are repeated until the spray parameter no longer exceeds the target threshold. If the spray parameter is less than the target threshold, then method 800 proceeds to act 812. In act 812, the user interface no longer displays the transient alarm but continues to display the persistent alarm. As such, the user interface conveys to an operator that there is not a present error, but preserves the previous spray quality error for later user inspection and troubleshooting.

In act 814, control circuitry determines whether the user interface has received an input from an operator to stop the persistent alarm. The control circuitry can continuously monitor the user interface for input from an operator to determine how method 800 should proceed. If operator input has not been detected, method 800 proceeds to act 816, and the user interface continues to display the alarm. After act 816, act 814 is repeated to determine whether the user interface has subsequently received an input from an operator to stop the persistent alarm. Acts 814 and 816 are repeated until the user interface receives input from an operator to stop the alarm. When the control circuitry detects input at the user interface to stop the alarm, method 800 proceeds from act 814 to act 818. In act 818, the control circuitry causes the user interface to stop displaying the alarm. Act 818 is performed after act 814, such that input at the user interface can cause the user interface to stop displaying the alarm.

Method 800 provides significant advantages. When a spray parameter exceeds a target threshold, both transient and persistent alarms are created. An operator can determine based on the presence of the transient and persistent alarms whether an error state is ongoing or whether the error state occurred previously. If only the persistent alarm is shown, the error state is no longer ongoing. Conversely, if both the transient and persistent alarms are shown, then the operator can infer that the error state is ongoing.

Further, method 800 preserves persistent alarms for diagnosing errors and performing spray system maintenance later. Method 800 allows an operator to focus on fluid application while operating the spray system rather than error collection and diagnosis. Similarly, method 800 eliminates the need for operators to interpret log data to diagnose and correct errors. Typically, log data records errors by the serial number of the sensor that detected the error. It can be difficult and cumbersome for operators to re-associate sensor serial numbers with spray nozzle locations. Method 800 advantageously allows an operator to view persistent error alarms through a GUI, such as GUI 700, that displays nozzle positional data with the persistent alarm.

In some examples, method 800 omits displaying a transient alarm (act 806) and further omits acts 808, 810, and 812. In these examples, acts 814, 816, and/or 818 are performed immediately after the persistent alarm is displayed in act 806. Examples of method 800 that omit a transient alarm allow for the creation of persistent alarms accessible through a GUI without requiring the creation of a transient alarm.

Although method 800 is described generally with respect to a single monitored spray parameter, if a spray monitoring system enables simultaneous monitoring of multiple spray parameters, multiple spray parameters can be monitored in act 802. In these examples, the other acts of method 800, including detecting that the monitored parameter has exceeded a threshold value (act 804), displaying transient and persistent alarms (act 806), monitoring a user interface to determine if it has received input to stop the persistent alarm (act 814), and stopping the persistent alarm after receiving input at a user interface (act 818), can be performed for each monitored spray parameter.

Method 800 is described herein with respect to monitoring a spray parameter to determine if the spray parameter exceeds a target maximum threshold and creating transient and persistent alarms if the spray parameter exceeds the target maximum threshold. However, method 800 can also be adapted to detect if a spray parameter is lower than a target minimum threshold to create transient and persistent alarms indicating that the spray parameter is lower than the target threshold. Furthermore, method 800 can be adapted to detect if a spray parameter is either lower than a target minimum threshold or higher than a target maximum threshold.

Spray Nozzle Groups

Figure 10:
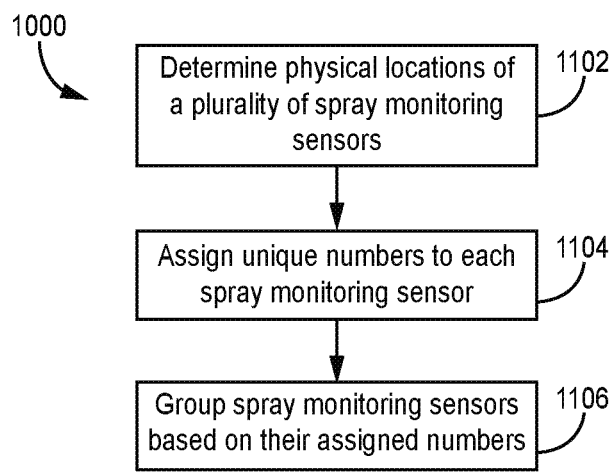
FIG. 10 is flow diagram for a method of generating the spray nozzle groups depicted by the GUIs depicted in FIGS. 7 and 8.

FIG. 10 is a flow diagram of method 1000 of generating spray nozzle groups. Method 1000 includes determining physical locations of a plurality of spray monitoring sensors (act 1002), assigning unique numbers to each spray monitoring sensor (act 1004), and grouping spray monitoring sensors based on their assigned numbers (act 1006).

Method 1000 is useful for assigning spray nozzle groups to spray monitoring systems that include large numbers of spray nozzles and sensors for individually monitoring spray parameters at the spray nozzles, such as spray monitoring system 110 (FIGS. 2-3). The spray nozzle groups generated by method 1000 can be used to process and associate other data generated by the spray monitoring system (e.g., as in FIG. 11 below).

In act 1002, physical locations are determined for each of a plurality of spray monitoring sensors. The spray monitoring sensors measure one or more spray parameters, and each spray monitoring sensor is disposed adjacent to a spray nozzle on a spray boom, such that each spray monitoring sensor generates spray parameter data for the adjacent spray nozzle. For example, the spray parameters sensors can be the spray monitoring sensor 30 shown in FIGS. 1-3. The physical locations determined in act 1002 can be, for example, a linear order of spray nozzles beginning at a first end of the spray boom and ending at a second, opposite end of the spray boom. Additionally and/or alternatively, the physical locations can correspond to coordinate positions of the spray monitoring sensors. The physical locations can be determined by, for example, manual input from an operator. Alternatively, the physical locations can be determined using method 1400, as described below with respect to FIG.

14. Because each of the spray monitoring sensors are disposed adjacent to individual spray nozzles, the locations generated in 1002 can also be used to infer the locations of individual spray nozzles along the boom.

In act 1004, the spray monitoring sensors are assigned unique identifiers based on the physical locations determined in act 1002. The identifiers can be, for example, numbers, letters, or another symbol to indicate a physical spray nozzle location. The identifiers function to allow an operator to quickly identify the positions of a spray monitoring sensor and an adjacent spray nozzle along a spray boom. For example, the unique identifiers can increase sequentially in a linear direction along the spray boom, such that a spray monitoring sensor at an end of the spray boom is assigned a identifier of "1," the second spray monitoring sensor from the end is assigned a identifier of "2," the third spray monitoring sensor from the end is assigned a identifier of "3," etc. Alternatively, any selected system for quickly and easily identifying the physical locations of spray monitoring sensors can be used to assign identifiers in act 1004. For example, the identifier could be based on both the spray nozzle group and the physical location of the spray nozzle. Because each spray monitoring sensor is disposed adjacent to and monitors one or more spray parameters of a single spray nozzle, the unique identifiers assigned to the spray monitoring sensors can also be used to identify individual spray nozzles.

In act 1006, spray monitoring sensors are grouped based on their assigned identifiers. Spray nozzle groups are groups of multiple spray monitoring sensors and are based on the unique identifiers assigned in act 1004. If the identifiers assigned in act 1004 are numbers that increase sequentially in a linear direction along the spray boom, the spray nozzle groups can be groups of consecutively-numbered spray monitoring sensors. For example, the spray monitoring sensors assigned numbers "1" though "8" can be assigned to a first group, the spray monitoring sensors assigned numbers "9" through "16" can be assigned to a second group, etc. It should be understood that groups of 8 sensors are described herein only for illustrative purposes, and any number of sensors can be assigned to each spray nozzle group based on application need and operator preference. Each spray nozzle group can have an equal number of sensors such that data describing the spray nozzle groups, such as average, maximum, or minimum information, is representative of an equal number of spray nozzles. Alternatively, it may be advantageous in some applications for spray nozzle groups to have differing numbers of sensors.

Figure 11:
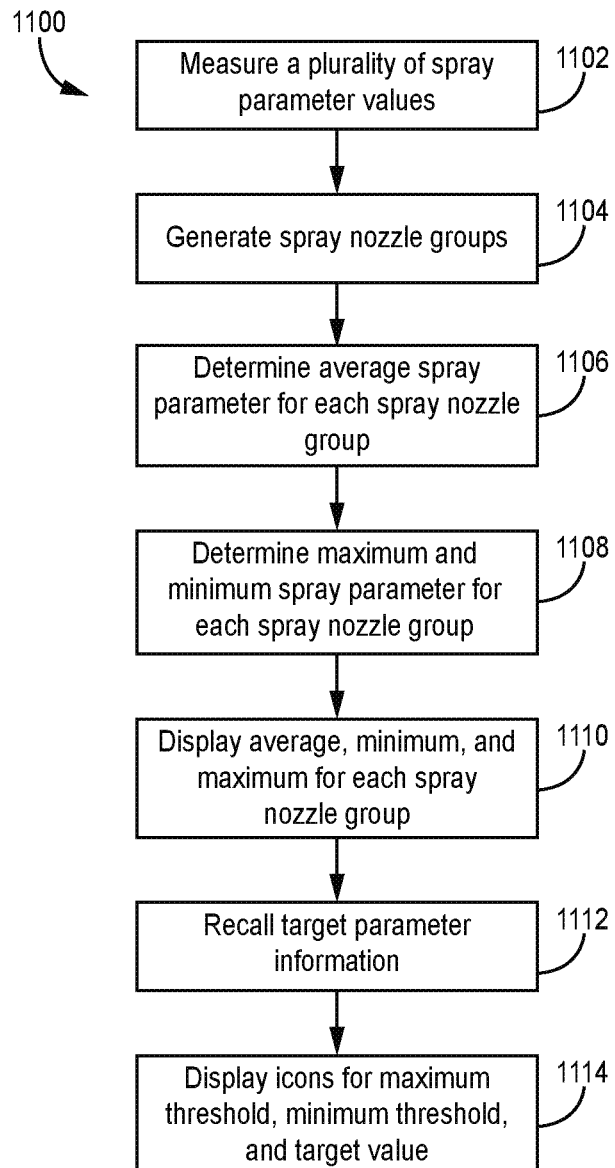
FIG. 11 is a flow diagram for a method of generating icons for display by the GUIs depicted in FIGS. 7 and 8.

FIG. 11 is a flow diagram of method 1100 for generating icons for display by a GUI, such as GUI 310 (FIG. 4), GUI 600 (FIG. 7), or GUI 700 (FIG. 8). Method 1100 includes measuring a plurality of spray parameter values (act 1102), generating nozzle groups (act 1104), determining an average spray parameter for each nozzle group (act 1106), determining a maximum and minimum spray parameter for each nozzle group (act 1108), displaying the average, minimum, and maximum for each nozzle group (act 1110), recalling target parameter information (act 1112), and displaying icons for maximum threshold, minimum threshold, and target value (act 1114).

In act 1102, a plurality of spray parameter values are measured across a plurality of spray nozzles. The spray parameter can be any spray parameter described herein, such as pressure, flow rate, application density, or droplet size, or any other useful parameter for describing fluid spray. The spray parameter can be measured by, for example, spray monitoring system 110, and can be individually measured for each spray nozzle in a spray system. In act 1104, nozzle groups are generated. Nozzle groups can be generated in act 1104 using method 1000 (FIG. 10) or any other selected method.

In act 1106, the spray parameters measured in act 1102 and the nozzle groups generated in act 1106 are used to generate average spray parameter values for each nozzle group. The averages reflect the average value of the spray parameter value measured by sensors assigned to each nozzle group. If the spray parameter is application rate and/or droplet size, the spray the average application rate and/or average droplet size can be determined by averaging the application rate and/or droplet size of each nozzle within a nozzle group. Additionally and/or alternatively, the average application rate and/or average droplet size can be based on average flow rate and pressure values, respectively, for each nozzle group.

In act 1108, the minimum and maximum of the spray parameter values are determined. The maximum and minimum for each nozzle group are the maximum and minimum values, respectively, of the spray parameters measured by sensors assigned to each nozzle group. Acts 1106 and 1108 can be performed by control circuitry, such as control circuitry 150, 160 (FIG. 3).

In act 1110, an average, minimum, and maximum is displayed for each nozzle group. The average, minimum, and maximum are displayed as spray parameter icons that represent the average, minimum, and maximum determined in acts 1106 and 1108. For example, the spray parameter icon can be a bar icon 340 (FIG. 7). The spray parameter icon can be displayed by a user interface to convey information about the spray parameter to an operator. The user interface can display other information about the spray nozzle group adjacent to the spray parameter icon, such as the individual spray nozzle identifiers of each spray nozzle included in the nozzle group.

In act 1112, control circuitry recalls target parameter information from a memory device. The target parameter information includes a target value, a maximum threshold, and a minimum threshold. The target value is an optimal value for the average determined in act 1106. The maximum threshold is the maximum value of the maximum determined in act 1108 that results in optimal spray. Similarly, the minimum threshold is the minimum value of the minimum determined in act 1108 that results in optimal spray. Act 1112 can be repeated to create multiple, different maximum and minimum values for a spray parameter, as described previously with respect to FIG. 4.

In act 1114, icons are displayed for the target value, minimum threshold, and maximum threshold recalled in act 1112. Control circuitry can cause the icons to be displayed by a user interface. The spray parameter icon generated in act 1110 can be overlaid with the icons corresponding to the target value, minimum threshold, and maximum threshold, such that an operator can visually compare the positions of the displayed spray parameter icon with the icons for the target, minimum, and maximum values to determine if the spray parameter should be adjusted.

Advantageously, method 1100 allows for the generation and display of icons representative of aggregate spray parameter information for spray nozzle groups. Icons that represent aggregate spray parameter information for spray nozzle groups provide an intermediate level of granularity between icons that represent system-wide spray parameter values and icons that represent spray parameter values for individual spray nozzles. Further, overlaying the bar icons on icons representing a target value, maximum threshold, and minimum threshold allows an operator to quickly and visually compare spray parameter data for a spray nozzle group with target, maximum threshold, and minimum threshold values.

User Interface for Adjusting Target and Threshold Values

Figure 12:
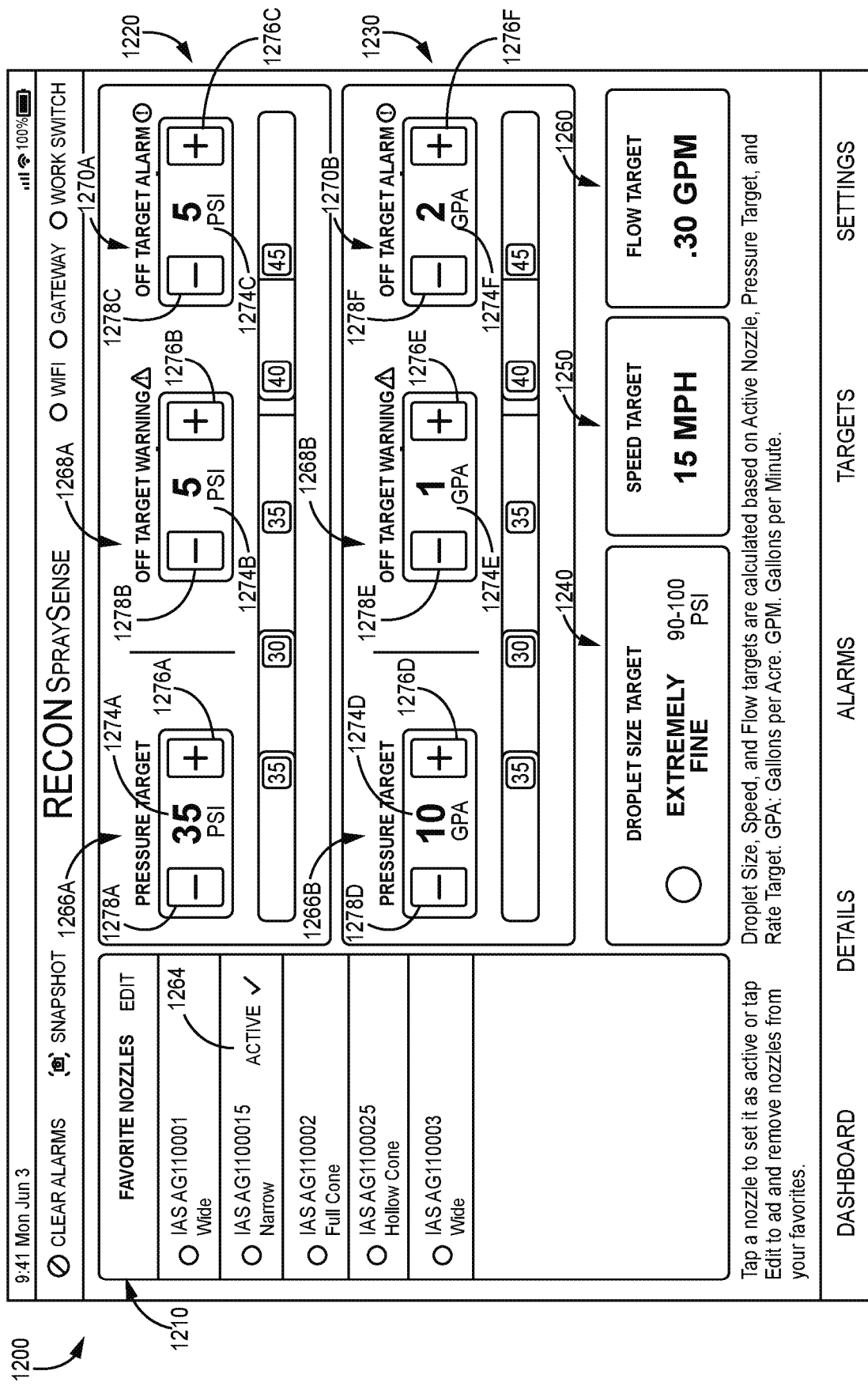
FIG. 12 is a schematic depiction of a GUI for setting spray parameter target and threshold values.

FIG. 12 is a schematic view of GUI 1200, which can be used to set spray parameter target and threshold values. GUI 1200 includes nozzle selection region 1210, pressure target region 1220, rate target region 1230, droplet size target region 1240, speed target region 1250, and flow target region 1260. Nozzle selection region 1210 includes active nozzle icon 1264. Pressure target region 1220 and rate target region 1230 include, respectively, target selection regions 1266A/1266B, first threshold selection regions 1268A/1268B, and second threshold selection regions 1270A/1270B. Target selection regions 1266A/1266B, first threshold selection regions 1268A/1268B, and second threshold selection regions 1270A/1270B each include text information 1274 (including 1274A-1274B), value increase icons 1276 (including 1276A-1276F), and value decrease icons 1278 (including 1278A-1278F).

Nozzle selection region 1210 displays a list of spray nozzle types as text information. An operator can interact with nozzle selection region 1210 to select a spray nozzle type as the active nozzle, which is used to determine other information displayed by GUI 1200 and other GUIs described herein. For example, the active nozzle is used to determine spray droplet size and is also used to determine the information displayed as nozzle icon 370 in GUI 310 (FIG. 4), GUI 600 (FIG. 7), and/or GUI 700 (FIG. 8). An operator can further interact with nozzle selection region 1210 or to edit the displayed list of spray nozzle types. After an operator selects a spray nozzle type, active nozzle icon 1264 is displayed next to the text information for the selected spray nozzle type. Active nozzle icon 1264 is displayed as a check mark and text, but any icon can be used as active nozzle icon 1264 to alert an operator to which spray nozzle type is currently selected and used by other elements of GUI 1200 or another GUI described herein.

Pressure target region 1220 is used to select the target parameter, maximum thresholds, and minimum thresholds for system pressure, as represented by target value icon 350B, maximum threshold icons 352B/372B, and minimum threshold icons 354B/374B for system pressure region 320 of GUI 310 (FIG. 4). An operator can set the value displayed by target value icon 350B by interacting with target selection region 1266A of pressure target region 1220. Similarly, an operator can set the values represented maximum threshold icon 352B and minimum threshold icon 354B by interacting with first threshold selection region 1268A, and can further set the values represented by maximum threshold icon 372B and minimum threshold icon 374B by interacting with second threshold selection region 1270A. Each of target selection region 1266A, first threshold selection region 1268A, and second threshold selection region 1270A display the currently selected value as text information 1274A-C, respectively.

The value displayed by text information 1274A corresponds to the desired target value. The value displayed by text information 1274B corresponds to an offset from the target value that should be used to generate first maximum and minimum thresholds represented by maximum threshold icon 352B and minimum threshold icon 354B, respectively. Similarly, the value displayed by text information 1274C corresponds to an offset form the target value that should be used to generate second maximum and minimum thresholds represented by maximum threshold icon 372B and minimum threshold icon 374B, respectively. Pressure target region 1220 allows an operator to set maximum and minimum thresholds that are symmetric about a target value. Advantageously, this simplifies the input required by an operator to generate information displayed by GUI 310, GUI 600, and GUI 700, as described previously with respect to FIGS. 4, 7, and 8. Alternatively, it may be advantageous in some embodiments to have separate, asymmetric values for each maximum and minimum threshold. In these embodiments, pressure target region 1220 can include additional icons or subregions to enable an operator to individually set maximum and minimum threshold values.

Rate target region 1230 is used to select the target parameter, maximum thresholds, and minimum thresholds for application density, as represented by target value icon 350C, maximum threshold icons 352C/372C, and minimum threshold icons 354C/374C for system application density region 324 of GUI 310 (FIG. 4). The icons and information displayed in rate target region 1230 are substantially similar to the icons and information displayed in pressure target region 1220 and described previously. An operator can set the value displayed by target value icon 350C by interacting with target selection region 1266B of rate target region 1230. Similarly, an operator can set the values represented maximum threshold icon 352C and minimum threshold icon 354C by interacting with first threshold selection region 1268B, and can further set the values represented by maximum threshold icon 372C and minimum threshold icon 374C by interacting with second threshold selection region 1270B. Each of target selection region 1266B, first threshold selection region 1268B, and second threshold selection region 1270B display the currently selected value as text information 1274D-F, respectively.

If the same maximum thresholds and minimum thresholds are used for spray nozzle groups (displayed in pressure region 320 and system application density region 324), individual spray nozzles (displayed in pressure region 320 and system application density region 324), and system-wide values (displayed in system pressure region 320, system flow rate region 322, system application density region 324, and system droplet size region 326), the value displayed by text information 1274A-C can also be used to generate centerlines 734, maximum threshold icons 652/672, and minimum threshold icons 654/674, respectively, displayed by GUI 600 and/or GUI 700 in pressure region 606. If the same maximum thresholds and minimum thresholds are used for nozzle groups represented in application density region 608 and nozzle group display regions 604 as for system application density region 324, the value displayed by text information 1274D-F can also be used to generate centerlines 734, maximum threshold icons 652/672/752/772, and minimum threshold icons 654/674/754/774, respectively, displayed by GUI 600 and/or GUI 700 in application density region 606.

Additionally and/or alternatively, GUI 1200 can include additional regions for entering values that should be used for one or more of centerlines 734, maximum threshold icons 652/672/752/772, and minimum threshold icons 654/674/754/774 of pressure region 606 and application density region 608.

An operator can adjust the values displayed as text information 1274A-F by interacting with value increase icons 1276 and value decrease icons 1278. GUI 1200 displays a value increase icons 1276A-F and value decrease icons 1278A-F adjacent to each of text information 1274A-F. Using text information 1274A as a relevant example, an operator can increase the displayed value using value increase icon 1276A and decrease the displayed value using value decrease icon 1278A. An operator can similarly adjust the values displayed by text information 1274B-F by interacting with value increase icons 1276B-F and value decrease icons 1278B-F. In some examples, GUI 1200 can display initial values recalled from, for example, memory 152, 162 as text information 1274A-F, and an operator can adjust the values using value increase icons 1276A-F and value decrease icons 1278A-F according to, for example, operational need or operator preference.

Value increase icons 1276 and value decrease icons 1278 represent one possibility of adjusting or entering the values represented as text information 1274A-F. Additionally and/or alternatively, an operator can manually enter the desired value by interacting with, for example, an on-screen keyboard.

Droplet size target region 1240 displays text information describing the target value used to generate target value icon 350A for system droplet size region 326, as shown in FIG. 4. The information displayed in droplet size target region 1240 can be generated by control circuitry 150, 160 based on the fluid type sprayed by spray nozzles 32, the spray nozzle type of spray nozzles 32, the target pressure displayed in pressure target region 1220, or another relevant parameter. Alternatively, an operator can interact with droplet size target region 1240 to manually set the target value for droplet size. In some examples, the value displayed in droplet size target region 1240 is used for both droplet size region 326 and droplet size icons 610. Additionally and/or alternatively, GUI 1200 can include additional regions for selecting a droplet size that should be used to generate droplet size icons 610.

Speed target region 1250 displays the reference velocity that is compared to the current velocity measured by velocity sensor 130 and thereby used to generate velocity icon 366, as previously described with respect to FIGS. 4, 7, and 8. The reference velocity can be determined automatically based on capabilities of vehicle 20, the fluid sprayed by spray nozzles 32, the spray nozzle type of spray nozzles 32, the target application density displayed in rate target region 1230, or another relevant parameter. Alternatively, an operator can interact with speed target region 1250 to manually set the target value for droplet size.

Flow rate target region 1260 displays text information describing the target value used to generate target value icon 350D for system flow rate region 322. The information displayed in flow rate target region 1260 can be generated by control circuitry 150, 160 based on the fluid type, the spray nozzle type, the target application density, or another relevant parameter. Alternatively, an operator can interact with droplet size target region 1240 to manually set the target value for droplet size.

Spray Monitoring Sensor Indexing

Figure 13:
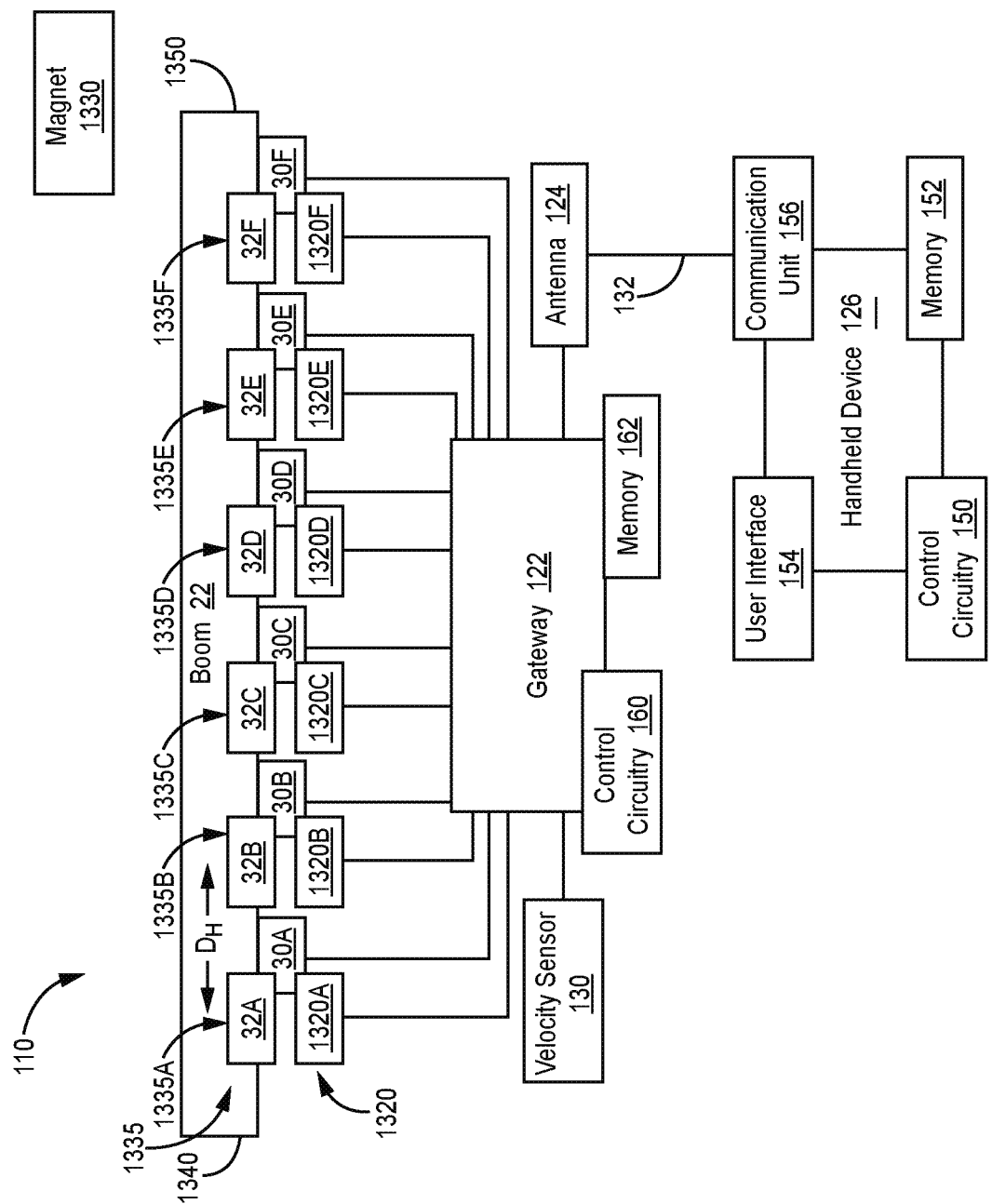
FIG. 13 is a schematic depiction of the monitoring system of FIGS. 2 and 3 including electromagnetic sensors.

FIG. 13 is a schematic depiction of spray monitoring system 110 showing electromagnetic sensors 1320 (including 1320A-F), magnet 1330, locations 1335 (including 1335A-F), first end 1340 of boom 22, and second end 1350 of boom 22. FIG. 13 also shows boom 22, spray monitoring sensors 30 (including 30A-F), gateway 122, antenna 124, velocity sensor 130, communication link 132, control circuitry 160, memory 162, and handheld device 126 (having control circuitry 150, memory 152, user interface 154, and communication unit 156) as described above with respect to FIG. 3. Spray system 110 is depicted as including boom 22 and spray nozzles 32 (including 32A-F).

Spray monitoring system 110 provides a number of advantages for indexing of spray monitoring sensors 30. As described herein, "indexing" of a spray monitoring sensor refers to the process of associating the spray monitoring sensor with a physical location or position along boom 22. Each spray monitoring sensor 30 can communicate a unique identifier (e.g., a serial number) to control circuitry 150, 160 with spray parameter data to individually identify data for each spray monitoring sensor 30. The serial number for each spray monitoring sensor 30 can be assigned a physical location or a location on boom 22, indexing the spray monitor sensor 30 and allowing control circuitry 150, 160 to correlate the spray parameter data generated using the spray monitoring sensor 30 with the location of the spray monitoring sensor 30 and, further, the location of the adjacent spray nozzle 32. Advantageously, an operator can use the location of a spray nozzle 32 and/or a spray monitoring sensor 30 to quickly identify which spray parameter information (e.g., pressure, flow rate, droplet size, or application density) corresponds to which spray nozzle 32 and, if necessary, perform maintenance on or replace spray nozzles that are performing poorly. The physical locations of each spray monitoring sensor 30 along the boom can be stored in memory 152, 162. User interface 154 can display the location of one spray monitoring sensor 30 alongside the spray parameter data generated using that spray monitoring sensor 30 to communicate to an operator which spray nozzles 32 are performing poorly and may require maintenance or replacement.

The physical locations or positions of spray nozzles 32 and/or spray monitoring sensor 30 can be, for example, a linear order of spray nozzles beginning at the first end 1340 of the spray boom 22 and ending at the second, opposite end 1350 of the spray boom. The physical locations can be assigned characters or numbers to assist operators in locating each physical location. As a specific example, as spray nozzles 32 and spray monitoring sensors 30 are indexed, spray monitoring sensors 30 can be assigned unique numbers to indicate their position along boom 22. Because each spray monitoring sensor 30 is adjacent to a single spray nozzle 32, the number assigned to one spray monitoring sensor 30 also indicates the position of the adjacent spray nozzle 32 along boom 22. For example, spray monitoring sensors 30 can be assigned numbers that increase in a linear direction along boom 22. An operator can use the number of spray monitoring sensor 30 to quickly determine which data displayed by user interface 154 corresponds to which physical spray monitoring sensor 30 and spray nozzle 32. For example, if spray parameter data from a spray monitoring sensor 30 indicates that the adjacent spray nozzle 32 should be replaced, an operator can use the unique number assigned to the spray monitoring sensor 30 to quickly locate the position of the adjacent spray nozzle 32 along boom 22 by counting spray nozzles 32 from the appropriate end of boom 22. Additionally and/or alternatively, the physical locations can correspond to coordinate positions of spray monitoring sensors 30.

It can take considerable time to configure spray monitoring system 110 with the locations of each spray monitoring sensor 30, particularly in embodiments of spray monitoring system 110 that have large numbers of spray monitoring sensors 30. Typically, an operator manually indexes each spray monitoring sensor 30 on boom 22. An operator can manually enter the serial number for each spray monitoring sensor 30 and assign each a position along boom 22.

Indexing the locations of spray monitoring sensors 30 can be partially simplified by sequentially numbering spray nozzles 32 in a linear order along boom 22. An operator can sequentially enter serial numbers for each spray monitoring sensor 30 starting from one end of boom 22 and ending at a second end of boom 22. The serial numbers can be entered using, for example, user interface 154 and communicated to control circuitry 150, 160. Control circuitry 150, 160 can be configured to expect the serial numbers for each spray monitoring sensor 30 to be entered sequentially and to automatically assign numeric positions along the boom to spray monitoring sensors 30 based on the order in which the serial numbers are entered into user interface 154.

While programming control circuitry 150, 160 with spray monitoring sensors 30 in a sequential and linear order can partially reduce the time required to configure spray monitoring system 110, manual entry of large numbers of serial numbers, such as would be required for embodiments of spray monitoring system 110 having large numbers (e.g., 140 or more) of spray monitoring sensors 30, is a time-consuming and labor-intensive process with considerable opportunity for human error. Further, manual entry often requires at least two operators to perform. Specifically, manual entry can require one operator to read aloud spray monitoring sensor system serial numbers attached to the boom and a second operator to manually enter the read serial numbers into a user interface device.

The embodiment of spray monitoring system 110 depicted in FIG. 13 includes electromagnetic sensors 1320, magnet 1330, locations 1335, first end 1340 of boom 22, and second end 1350 of boom 22, though other embodiments of spray monitoring system 110 do not include one or more of electromagnetic sensors 1320, magnet 1330, locations 1335, first end 1340 of boom 22, and second end 1350 of boom 22. However, electromagnetic sensors 1320 and magnet 1330 advantageously decrease the time required to configure the positions of spray monitoring sensors 30 along boom 22.

In the embodiment depicted in FIG. 13, spray monitoring system 110 includes six electromagnetic sensors 1320A-F, six spray monitoring sensors 30A-F, and six spray nozzles 32A-F. Each electromagnetic sensor 1320A-F is disposed adjacent to one of spray monitoring sensors 30A-F and spray nozzles 32A-F at one of locations 1335A-F along boom 22. In some examples, electromagnetic sensors 1320 are integrated with or attached to each spray monitoring sensor 30 to form an integrated unit that can be installed on boom 22 upstream of a spray nozzle 32 along fluid lines 50 (FIG. 1). Adjacent electromagnetic sensors 1320 along boom 22 are separated by a distance $D_H$. Distance $D_H$ between adjacent electromagnetic sensors 1320 is constant along boom 22.

Each spray monitoring sensor 30A-F is physically adjacent to one spray nozzle 32A-F. Further, each electromagnetic sensor 1320A-F is physically adjacent to a single spray monitoring sensor 30A-F. Electromagnetic sensors 1320A-F, spray monitoring sensors 30A-F, and spray nozzles 32A-F are disposed in associated sets at discrete locations 1335A-F along boom 22. The location 1335A-F of each of electromagnetic sensors 1320A-F along boom 22 can be used to determine locations 1335A-F at which spray monitoring sensors 30A-F and/or spray nozzles 32A-F are positioned, and thereby index spray monitoring sensors 30A-F and/or spray nozzles 32A-F.

Electromagnetic sensors 1320 are configured to detect the presence and, in some examples, the magnitude of an electromagnetic field using the Hall effect. However, electromagnetic sensors 1320 may be any selected electromagnetic sensor for detecting a magnetic field. Each electromagnetic sensor 1320 is generally configured to sense magnetic fields within a threshold detection distance of electromagnetic sensor 1320. The threshold distance is generally uniform among electromagnetic sensors 1320, but, in some examples, it may be advantageous to have a non-uniform threshold distance.

When an electromagnetic sensor 1320 detects a magnetic field, it sends a signal to gateway 122. The signal includes identifying information, such as a serial number for spray monitoring sensor 30 adjacent to electromagnetic sensor 1320, and further indicates that electromagnetic sensor 1320 has sensed a magnetic field. The signals can be communicated to handheld device 126 via communication link 132.

Magnet 1330 is a magnet capable of producing a magnetic field that can be detected by electromagnetic sensors 1320, and is not attached to other components of spray monitoring system 110, such that magnet 1330 can be moved relative to the other components of spray monitoring system 110. For simplicity magnet 1330 can be a permanent magnet having a permanent and constant magnetic field. However, it should be understood magnet 1330 can be any suitable device for producing a magnetic field. For example, magnet 1330 can be an electromagnetic device capable of producing a magnetic field detectable by electromagnetic sensors 1320.

Electromagnetic sensors 1320 are configured to detect the magnetic field of magnet 1330. An operator can bring magnet 1330 within the threshold detection distance of electromagnetic sensor 1320 to cause electromagnetic sensor 1320 to send a signal to gateway 122 indicating that electromagnetic sensor 1320 detected the magnetic field of magnet 1330. The threshold detection distance of each electromagnetic sensor 1320 can be relatively small, such that electromagnetic sensors 1320 only detects the magnetic field of magnet 1330 when magnet 1330 is adjacent to or touching the electromagnetic sensor 1320.

Control circuitry 150, 160 can be configured to receive signals from electromagnetic sensors 1320 in a predetermined sequential order. The predetermined sequential order is also known to the operator, such that the operator can sequentially trip adjacent electromagnetic sensors 1320 with magnet 1330. When each electromagnetic sensor 1320 detects the magnetic field of the magnet 1330, a signal containing an identifier for the adjacent spray monitoring sensor 30 is sent to control circuitry 150, 160. Control circuitry 150, 160 can thereby assign location 1335 along boom 22 to each spray monitoring sensor 30 based on the predetermined sequential order and the order in which control circuitry 150, 160 receives signals from electromagnetic sensors 1320.

For example, the predetermined sequential order can be a linear order beginning at first end 1340 of boom 22 and ending at second end 1350 of boom 22. An operator can first bring magnet 1330 within the threshold detection distance of electromagnetic sensor 1320A closest to first end 1340 of boom 22, causing electromagnetic sensor 1320A to produce a signal indicating that a magnetic field has been detected and containing an identifier for the adjacent spray monitoring sensor 30A. Control circuitry 150, 160 can receive the signal from electromagnetic sensor 1320A and, based on the predetermined sequential order, assign location 1335A to spray monitoring sensor 30A. The operator can then bring permanent magnet within the threshold detection distance of electromagnetic sensor 1320B, causing electromagnetic sensor 1320B to produce a signal indicating that a magnetic field has been detected and containing an identifier for the adjacent spray monitoring sensor 30B. Control circuitry 150, 160 can receive the signal from electromagnetic sensor 1320A and, based on the predetermined sequential order, assign location 1335B to spray monitoring sensor 30B. The process can be repeated for the remaining electromagnetic sensors 1320C-F on boom 22 to automatically assign the remainder of locations 1335C-F to the remainder of spray monitoring sensors 30C-F.

Each of locations 1335A-F can be stored in memory 152, 162 so that control circuitry 150, 160 can assign locations 1335A-F to each set of electromagnetic sensors 1320 A-F, spray monitoring sensors 30A-F, and spray nozzles 32A-F. Memory 152, 162 can also store the predetermined order and control circuitry 150, 160 can recall the predetermined order to assign locations 1335A-F. Each of locations 1335A-F can be stored as numbers indicating the position relative to first end 1340 or second end 1350 of boom 22. Advantageously, this allows an operator to quickly locate one spray monitoring sensor 30 and one spray nozzle 32 by counting nozzles from an end of boom 22. Additionally and/or alternatively, locations 1335A-F can include coordinate information, such as three-dimensional coordinate data or a distance that each location 1335A-F is spaced from an end of boom 22.

The embodiment of spray monitoring system shown in FIG. 13 provides a number of advantages. Notably, the use of electromagnetic sensors 1320 and magnet 1330 substantially increases the ease and efficiency with which spray monitoring sensors 30 and, consequently, spray nozzles 32 can be indexed. Further, the embodiment of spray monitoring system 110 shown in FIG. 13 allows a single operator to index spray monitoring sensors 30. For example, using pre-existing methods, indexing a boom having 140 spray monitoring sensors and spray nozzles requires 30 to 60 minutes and at least two operators. The methods described herein allow a boom having 140 spray monitoring sensors and spray nozzles to be indexed in 10 minutes using a single operator. These methods also significantly reduce the opportunity for human error in data entry.

Although FIG. 13 depicts spray monitoring system 110 with six sets of electromagnetic sensors 1320, spray monitoring sensors 30, and spray nozzles 32, spray monitoring system 110 can be configured to have any number of sets of electromagnetic sensors 1320, spray monitoring sensors 30, and spray nozzles 32. In some examples, spray monitoring system 110 can contain a large number (e.g., 140 of more) of each. Generally, however, spray monitoring system 110 includes equal numbers of electromagnetic sensors 1320, spray monitoring sensors 30, and spray nozzles 32. Examples having equal numbers of spray monitoring sensors 30 and spray nozzles 32 allow spray monitoring parameters to be monitored for individual spray nozzles 32. Further, examples having equal numbers of electromagnetic sensors 1320 and spray monitoring sensors 30 allow for indexing and locating of each spray monitoring sensor 30, allowing a control circuitry to associate spray monitoring data with individual nozzle locations and further allowing an operator to quickly locate poorly performing nozzles.

Electromagnetic sensors, such as electromagnetic sensors 1320, provide a number of advantages over other varieties of sensors. For example, some existing systems use vibration sensors configured to detect a strike or impact and to produce a signal indicating an identifier for a spray monitoring sensor to determine nozzle locations. However, these existing systems that use vibration sensors have significant disadvantages. For example, the strike used to trigger the vibration sensors can damage the vibration sensors, components of spray monitoring sensors, or other components of spray monitoring system 110. The strike used to trigger the vibration sensors can also negatively affect the calibration of the associated spray monitoring sensor. Advantageously, electromagnetic sensors 1320 do not need to be struck to activate. In fact, it is not necessary that magnet 1330 touch electromagnetic sensors 1320 for electromagnetic sensors 1320 to detect the magnetic field of magnet 1330. In this manner, spray monitoring system 110 reduces the likelihood of damage to components of spray monitoring system 110 as compared to alternative embodiments using, for example, vibration sensors.

Electromagnetic sensors 1320 can be selectively operated to prevent indexing errors during operation of spray system 110. As vehicle 20 moves, electromagnetic sensors 1320 may encounter additional magnetic fields from, for example, magnetic soil deposits. If electromagnetic sensors 1320 send additional signals to control circuitry 150, 160, control circuitry 150, 160 can reindex the corresponding spray monitoring sensor 30 as the last sensor in the predetermined order. Using the embodiment of spray monitoring system 110 depicted in FIG. 13 as an illustrative example, if electromagnetic sensor 1320B encounters a magnetic field as vehicle 20 moves across a field and sends a signal to control circuitry 150, 160, control circuitry 150, 160 can re-index spray monitoring sensor 30B and assign it the next available location along spray boom 22, which would be further from first end 1340 than spray monitoring sensor 30F. In this manner, accidental re-indexing can result in control circuitry 150, 160 assigning an incorrect location or multiple locations to spray monitoring sensors 30.

To prevent indexing errors, control circuitry 150, 160 can selectively operate electromagnetic sensors 1320. Control circuitry 150, 160 can send a signal to electromagnetic sensors 1320 to activate and sense magnetic fields to perform indexing. Once indexing is complete, control circuitry 150, 160 can send a second signal to electromagnetic sensors 1320 instructing electromagnetic sensors 1320 to deactivate to prevent indexing errors during operation of spray system 10. Control circuitry 150/160 can be configured to automatically send a signal for electromagnetic sensors 1320 to deactivate once control circuitry 150, 160 detects movement of vehicle 20 using velocity sensor 130. Additionally and/or alternatively, an operator can cause control circuitry 150, 160 to activate or deactivate electromagnetic sensors 1320 through input at user interface 154.

Figure 14:
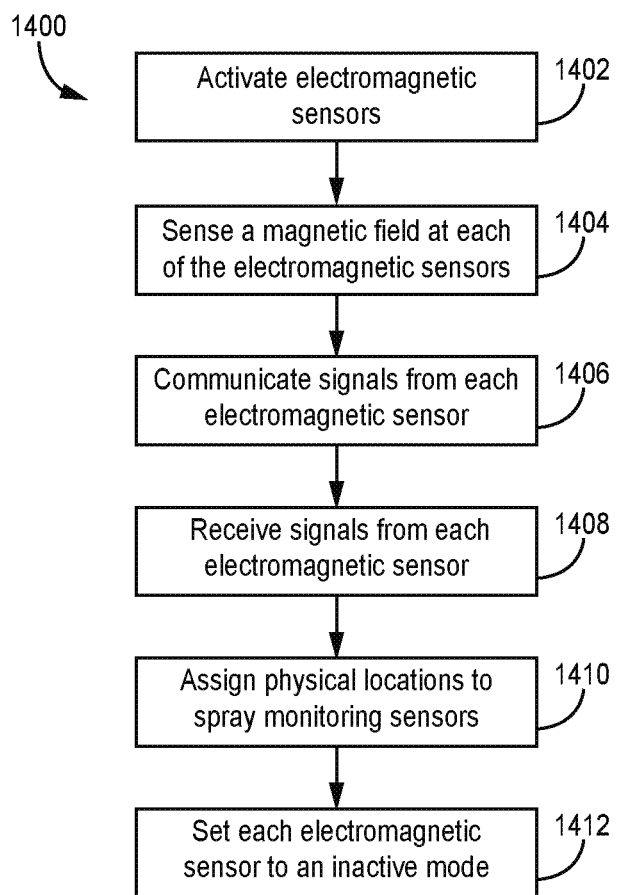
FIG. 14 is a flow diagram for a method of indexing the locations of spray monitoring sensors.

FIG. 14 is a flow diagram of method 1400 of indexing spray monitoring sensors in a spray monitoring system using electromagnetic sensors. Method 1400 includes activating electromagnetic sensors (act 1402), sensing a magnetic field at each of the electromagnetic sensors (act 1404), communicating signals from each electromagnetic sensor (act 1406), receiving the signals from each electromagnetic sensor (act 1408), assigning physical locations to spray monitoring sensors (act 1410), and setting the electromagnetic sensors to an inactive mode (act 1412).

The electromagnetic sensors are disposed adjacent to spray monitoring sensors, such that the physical location of each electromagnetic sensor can be used to approximate the location of one spray monitoring sensor. Further, if the spray monitoring sensors and electromagnetic sensors are disposed along a linear boom, the position of each electromagnetic sensor can be used to determine the distance of the adjacent spray monitoring sensor from an end of the boom. Discrete locations along the boom can also be assigned numeric positions, and the numeric position of the electromagnetic sensor can be used to determine the numeric position of the spray monitoring sensor. If each spray monitoring sensor is disposed adjacent to and measures spray parameters for a single spray nozzle, the physical location or numeric position of each electromagnetic sensor can also be used to locate each spray nozzle. This allows the exact location of poorly performing spray nozzles to be identified.

In act 1402, the electromagnetic sensors are activated from an inactive state. The electromagnetic sensors can be electronically connected to control circuitry and the control circuitry can send a signal to activate the electromagnetic sensors. An operator can interact with a user interface to cause the control circuitry to send the signal to deactivate the electromagnetic sensors. Additionally and/or alternatively, the electromagnetic sensors can include, for example, on or more physical switches or buttons that can be used to deactivate the electromagnetic sensors. In the inactive state, the electromagnetic indexing sensors are idle and are not used for indexing.

In act 1404, a magnetic field is sensed at each of the electromagnetic sensors. The magnetic field can be produced by, for example, a permanent magnet. An operator can manually bring the permanent magnet within a threshold detection distance of each of the electromagnetic sensors to allow the electromagnetic sensors to sense the magnetic field of the magnet. The operator can move between sensors with the permanent magnet in a predetermined and sequential order to allow physical locations to be assigned to each spray monitoring sensor in act 1410. The predetermined sequential order includes known locations where electromagnetic and spray monitoring sensor pairs are disposed as well as the expected order in which an operator will use the magnet to trip the electromagnetic sensors. In embodiments of the spray monitoring system where sets of electromagnetic sensors and spray monitoring sensors are disposed along a boom, the predetermined sequential order can require an operator to sequentially trip the electromagnetic sensors as the operator travels down the length of the boom, starting at a first end of the boom and ending at a second end of the boom.

In act 1406, the electromagnetic sensors communicate signals to control circuitry. Each electromagnetic sensor communicates a signal at substantially the same time as the electromagnetic sensor senses the magnetic field in act 1404, causing the signals to be sent in an order. The signals sent by each electromagnetic sensor include an identifier, such as a serial number, representative of the spray monitoring sensor adjacent to each electromagnetic sensor, allowing the control circuitry to use the signals to assign physical locations to the spray monitoring sensors in act 1410. Thus, the signals can be communicated by the electromagnetic sensors.

In act 1408, the signals are received by control circuitry in the same order in which the signals are sent by each electromagnetic sensor. The first signal received corresponds to the first electromagnetic sensor in the predetermined sequential order (act 1404), the second signal received corresponds to the second electromagnetic sensor in the predetermined sequential order, etc.

In act 1410, the control circuitry assigns physical locations to the spray monitoring sensors based on the predetermined sequential order in act 1404 and the order in which signals are received by the control circuitry in act 1408. The predetermined sequential order can be stored in a memory and used by the control circuitry in act 1410. The predetermined sequential order includes information about the location or numeric position along the spray boom of each set of electromagnetic and spray monitoring sensors. As such, the control circuitry can determine which physical location of the known locations described by the predetermined sequential location to assign each spray monitoring sensor based on the order in which signals are received in act 1408. Because the signals from the electromagnetic sensors include an identifier, such as a serial number, for the adjacent spray monitoring sensor, the control circuitry can assign the identifier for each electromagnetic sensor to one of the known locations in the predetermined sequential order and store that information in a memory for later use.

During the operation of the spray monitoring system, the control circuitry causes a user interface to display the stored location information for each spray monitoring sensor alongside the spray parameter data measured or generated using the spray monitoring sensor. Because each spray monitoring sensor monitors and is disposed adjacent to a single spray nozzle, an operator can use the displayed location information to quickly locate a poorly performing spray nozzle, as indicated by spray parameter data displayed by the user interface.

In act 1412, the electromagnetic sensors are set to an inactive mode. Setting the electromagnetic sensors to an inactive mode prevents indexing errors from occurring during operation of the spray system. Control circuitry can send a signal to cause the electromagnetic sensors to become inactive or enter an idle state. An operator can interact with a user interface to cause the control circuitry to send the signal to cause the electromagnetic sensors to enter the inactive mode. Additionally and/or alternatively, the electromagnetic sensors can include, for example, on or more physical switches or buttons that can be used to cause the electromagnetic sensors to become inactive or enter an idle state.

Method 1400 can be performed while installing other components of spray system 10 or spray monitoring system 110, including, for example, spray monitoring sensors 30 or spray nozzles 32. In some examples of spray monitoring systems, it can be advantageous to install electromagnetic sensors and spray monitoring sensors in a nonlinear order. For example, it may be advantageous for two operators to install sets of electromagnetic and spray monitoring sensors starting from opposite ends of a linear spray boom. A third operator can index the spray monitoring sensors using method 1400 as the other two operators install the sets of electromagnetic and spray monitoring sensors and, further, can index the spray monitoring sensors in a linear order beginning from a first end of the spray boom and ending at a second end of the spray boom.

Method 1400 substantially improves the ease and efficiency with which spray monitoring sensors in a spray monitoring system can be indexed. Method 1400 complements spray monitoring systems that provide spray parameter information about individual nozzles by increasing the ease with which such spray monitoring systems can be configured. Method 1400 also reduces the number of operators required to index spray monitoring sensors, decreasing labor costs associated with indexing spray monitoring sensors. While previous methods of indexing sensors require at least two operators, method 1400 can be performed by a single operator. Further, method 1400 advantageously allows electromagnetic sensors used for indexing to be selectively operated, preventing indexing errors from arising during operation of the spray system indexed by method 1400.

Although method 1400 has been generally described with respect to a human operator, it should be understood that the operator can be a human operator or a computerized operator. For example, an autonomous or human-controlled robot can be configured to perform the methods of construction layout described herein. Components of spray monitoring system 110, such as magnet 1330, can be incorporated or attached separately to a human-controlled or autonomous robot and used to perform acts of method 1400.

Spray Nozzle Fault Detection

Figure 15A:
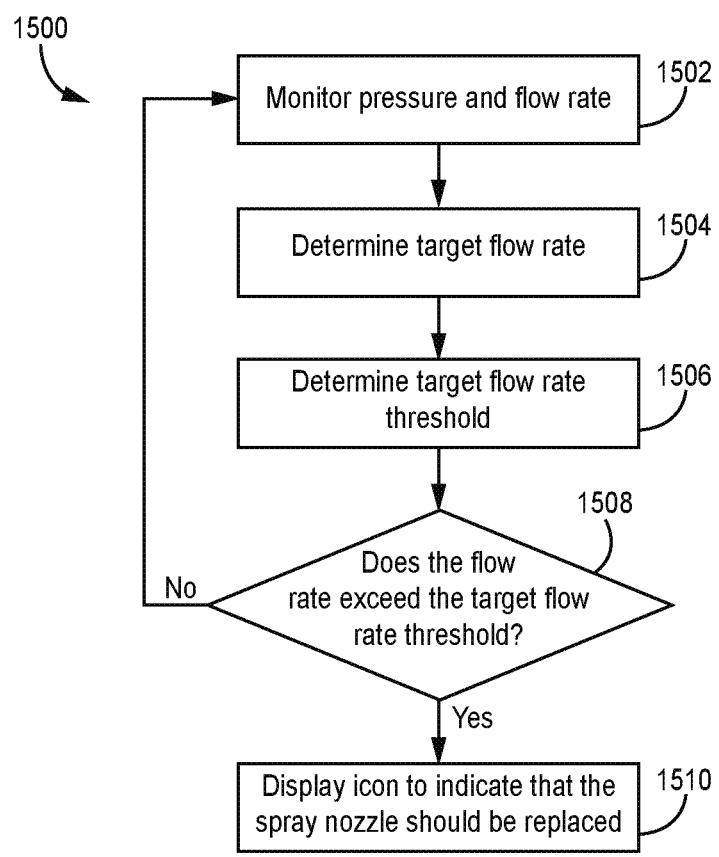
FIG. 15A is a flow diagram for a method of detecting spray nozzle wear.

FIG. 15A is a flow diagram of method 1500 of detecting spray nozzle wear. Method 1500 monitors flow rate at a given pressure to determine spray nozzle wear. Method 1500 includes measuring a pressure and flow rate (act 1502), determining a target flow rate (act 1504), determining a target flow rate threshold (act 1506), determining whether the flow rate exceeds the target flow rate threshold (act 1508), and displaying an icon to indicate that the spray nozzle should be replaced (act 1510).

Spray nozzles 32 may be made of a material that can be abraded or otherwise degraded by fluid, such as a plastic polymer material. As spray nozzles 32 wear from repeated use, the size of the aperture of spray nozzles 32 used to spray fluid can increase, altering the spray characteristics of spray nozzles 32. For example, as the aperture of spray nozzle 32 increases in size, the flowrate of spray nozzle 32 may increase at a given pressure or the pressure of spray nozzle 32 may decrease at a given flow rate. Consequently, material wear can also impact application density of a given spray nozzle 32 at a given pressure or droplet size at a given flow rate.

Further, spray nozzle aperture wear can cause changes in spray patterns and spray angles of spray nozzles 32. For example, if an aperture of spray nozzle 32 wears unevenly, the spray pattern from spray nozzle 32 can deviate from the intended spray pattern of spray nozzle 32, which can cause uneven application of the fluid sprayed by spray nozzle 32. Similarly, the wear of the aperture of spray nozzle 32 can cause an increase in spray angle from spray nozzle 32, creating a more diffused spray from spray nozzle 32. A more diffused spray can impact spray pattern overlap between adjacent spray nozzles 32 on boom 22, and may cause uneven application of fluid sprayed by spray nozzles 32. Improved fault detection allows spray nozzles to be controlled to compensate for actual minor nozzle degradation, and indicates when more severe nozzle degradation necessitates replacement.

It is advantageous to replace spray nozzles 32 before spray nozzles 32 wear sufficiently to cause spray parameters of spray nozzles 32 to significantly deviate. Spray nozzles 32 can be removably attached to pressure/flow rate sensors 30 or a terminal end of fluid lines 50 by, for example, a screw or clip attachment.

In act 1502, pressure and flow rate are measured for a spray nozzle. The spray nozzle can be one spray nozzle in a spray system having a plurality of spray nozzles. The pressure and flow rate are measured, respectively, using pressure and flow rate sensors in a spray monitoring system. The spray monitoring system can include multiple pressure and flow rate sensors. One pressure sensor and one flow rate sensor are disposed adjacent to and configured to measure the pressure and flow rate, respectively, of a single spray nozzle. The pressure and flow rate sensors are individually identified so that pressure and flow rate data produced by the pressure and flow rate sensors can be associated with a particular spray nozzle. For example, the spray monitoring system can be spray monitoring system 110, which individually measures pressure and flow rate of fluid sprayed by each spray nozzle in the spray system. The pressure sensor can be pressure sensor 30A, and the flow rate sensor can be flow rate sensor 30B as shown in FIG. 3. The sensed pressures and flow rates can be received by control circuitry 150, 160, and stored to a memory 152, 162, each shown in FIGS. 2-3.

In act 1504, a target flow rate is determined. The target flow rate represents an ideal flow rate for the spray nozzle at a given pressure. Control circuitry determines the target flow rate based on the measured pressure. Specifically, the memory can store a lookup table that includes ideal flow rate values at various pressures. The control circuitry can cross-reference the lookup table with the measured pressure and recall the target flow rate value from the lookup table. The lookup table can include pressure and flow data for multiple spray nozzle types. In some embodiments, multiple lookup tables can be used, each including pressure and flow rate data for an individual spray nozzle type. The spray nozzle type can be stored to the memory, and control circuitry can use the stored spray nozzle type in addition to the measured pressure to cross-reference the lookup table(s) and determine the target flow rate value.

The target flow rate can be stored to the memory. Act 1504 can be performed immediately after or substantially immediately after act 1502, such that control circuitry cross-references the lookup table and recalls the target flow rate value immediately or substantially immediately after receiving the measured pressure from the pressure sensor.

In act 1506, a target flow rate threshold is determined. The target flow rate threshold is based on the target flow rate value, and represents the largest flow rate value that should be measured at a given pressure for a spray nozzle that is not significantly worn. The target flow rate threshold represents the maximum value of the flow rate measured in act 1502 at the pressure measured in act 1502 that produces acceptable spray quality. A flow rate measured in act 1502 that exceeds the target flow rate threshold indicates that the spray nozzle is worn and is not producing acceptable spray quality, and accordingly should be replaced. A flow rate measured in act 1502 that does not exceed the target flow rate threshold indicates that the spray nozzle produces acceptable spray quality, even if the measured flow rate exceeds the target flow rate determined in act 1504.

The target flow rate threshold is determined by multiplying the target flow rate determined in act 1504 by a reference value. The reference value is a multiplier that represents the maximum deviation from the target flow rate that still creates optimal spray quality. The reference value can be based on properties of the fluid sprayed, application needs, or operator preference, among other options. For example, for a given fluid, an increase in flow rate of more than 10% over the target flow rate may lead to decreased spray quality. The reference value can accordingly be a value of 1.1, such that multiplying the target flow rate determined in act 1504 produces a target flow rate threshold that is 10% higher than the target flow rate. As such, a flow rate measured in act 1502 that exceeds the target flow rate threshold is more than 10% greater than the target flow rate determined in act 1504, indicating that the spray nozzle at which the flow rate was measured in act 1502 is producing suboptimal spray and should be replaced. A flow rate measured in act 1502 that does not exceed the target flow rate threshold is not more than 10% greater than the target flow rate, indicating that the spray nozzle at which the flow rate was measured is performing properly.

The target flow rate threshold can be generated by the control circuitry. The reference value used to generate the target flow rate threshold can be stored to a memory of the spray monitoring system and can be recalled by the control circuitry in act 1506 to determine the target flow rate threshold. The target flow rate threshold determined in act 1506 can also be stored to the memory.

In some examples, the target flow rate threshold for various pressure values can be stored in a lookup table. The pressure measured in act 1502 can be used to cross-reference the lookup table and recall the target flow rate threshold. In these examples, method 1500 can proceed directly from act 1502 to act 1506.

In act 1508, control circuitry determines whether the flow rate measured in act 1502 exceeds the target flow rate threshold generated in act 1506. The control circuitry can recall the measured flow rate and the target flow rate threshold from memory. If the flow rate measured in act 1502 exceeds the target flow rate threshold generated in act 1506, method 1500 proceeds to act 1510.

In act 1510, the control circuitry causes a user interface to display an icon indicating that the spray nozzle for which the pressure and flow rate were measured in act 1502 should be replaced. Because each pressure and flow rate sensor is individually identified and measures the pressure and flow rate of a single spray nozzle, the control circuitry can recall location information for the spray nozzle and display an icon indicating that the spray nozzle is worn and should be replaced. The icon can take any selected form for conveying to an operator that the spray nozzle should be replaced. The icon can include, for example, text, one or more shapes or symbols, and one or more colors, among other options.

If the flow rate measured in act 1502 does not exceed the target flow rate threshold generated in act 1506, method 1500 proceeds from act 1508 to act 1502. The acts of method 1500 can be performed iteratively to allow for continuous or substantially continuous monitoring of the spray nozzle to determine whether the spray nozzle is worn.

In some examples, it can be advantageous to proceed to act 1510 only when the flow rate measured in act 1502 exceeds the target flow rate threshold generated in act 1506 for a minimum time period. During the operation of the spray system, vibrations and other forces on components of the spray system can cause transient increases in flow rate. The transient increases in flow rate from vibrations or other forces are temporary and are not indicative of spray nozzle wear. For example, in the operation of spray system 10, if vehicle 20 passes over uneven terrain, the resulting vibrations can cause a transient increase in the flow rate.

The minimum time is selected to discriminate between transient increases in flow rate due to vibrations and sustained increases indicative of spray nozzle wear. If the measured flow rate exceeds the target flow rate threshold for the minimum time, the high flow rate is likely due to spray nozzle wear, and control circuitry causes method 1500 to proceed to act 1510. If the measured flow rate does not exceed the target flow rate threshold for the minimum time, the high flow rate is likely not due to spray nozzle wear, and control circuitry causes method 1500 to proceed from act 1508 to act 1502. The minimum time can be, for example, 10 seconds. Act 1502 can be repeated multiple times to generate multiple flow rate measurements during the minimum time period and act 1508 can be performed multiple times to determine if the flow rate exceeds the target flow rate threshold for the duration of the minimum time period.

Method 1500 can be performed simultaneously or substantially simultaneously for all spray nozzles in a spray system using additional pairs of pressure and flow rate sensors arranged and configured to generate pressure and flow rate data for each spray nozzle in the spray system. As each pressure and flow rate sensor is individually identified, the control circuitry can cause the user interface to display location data to allow an operator to locate and replace poorly performing spray nozzles.

Figure 15B:
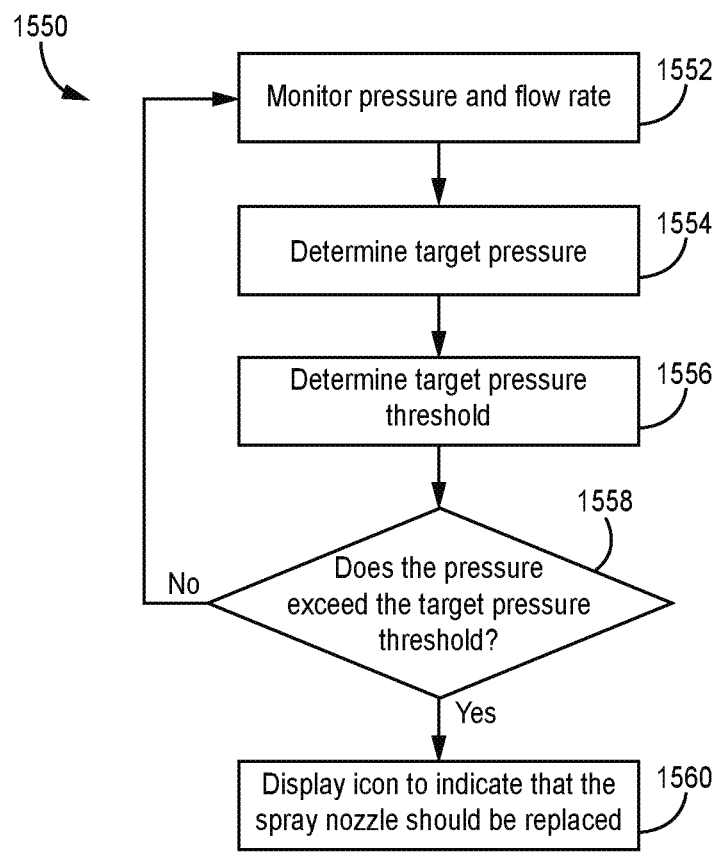
FIG. 15B is a flow diagram for another method of detecting spray nozzle wear.

FIG. 15B is a flow diagram of method 1550 of detecting spray nozzle wear. Method 1550 is substantially similar to method 1500 and includes measuring a pressure and flow rate (act 1552), determining a target pressure (act 1554), determining a target pressure threshold (act 1556), determining whether the pressure is lower than the target pressure threshold (act 1558), and displaying an icon to indicate that the spray nozzle should be replaced (act 1560).

In act 1552, pressure and flow rate are measured for a spray nozzle, which may be substantially similar to act 1502 shown in FIG. 15A.

In act 1554, a target pressure is determined. The target pressure represents an ideal pressure for the spray nozzle at a given flow rate. Control circuitry determines the target pressure based on the measured flow rate. Specifically, the memory can store a lookup table that includes ideal pressure values at various flow rates. The control circuitry can cross-reference the lookup table with the measured flow rate and recall the target pressure value from the lookup table. The target pressure can be stored to the memory.

The lookup table can include pressure and flow data for multiple spray nozzle types. In some embodiments, multiple lookup tables can be used, each including pressure and flow rate data for an individual spray nozzle type. The spray nozzle type can be stored to the memory, and control circuitry can use the stored spray nozzle type in addition to the measured flow rate to cross-reference the lookup table(s) and determine the target pressure value.

In act 1556, a target pressure threshold is determined. The target pressure threshold is based on the target pressure value and represents the lowest pressure value that should be measured at a given flow rate for a nozzle that is not significantly worn. The target pressure threshold represents the minimum value of the pressure measured in act 1552 at the flow rate measured in act 1552 that produces acceptable spray quality. A pressure measured in act 1552 that is lower than the target pressure threshold indicates that the spray nozzle is worn and is not producing spray with acceptable spray quality, and accordingly should be replaced. A pressure measured in act 1552 that is greater than the target pressure threshold indicates that the spray nozzle produces acceptable spray quality, even if the measured pressure is lower than the target pressure determined in act 1554.

The target pressure threshold is determined by multiplying the target pressure determined in act 1554 by a reference value, similar to the target flow rate threshold in act 1504 of FIG. 15A.

As noted above with respect to act 1506, the target pressure threshold can be generated by the control circuitry. The reference value used to generate the target pressure threshold can be stored to a memory of the spray monitoring system and can be recalled by the control circuitry in act 1556 to determine the target pressure threshold. The target pressure threshold determined in act 1556 can also be stored to the memory.

Also as noted above with respect to act 1506, in some examples, the target pressure threshold for various flow rate values can be stored in a lookup table. The flow rate measured in act 1552 can be used to cross-reference the lookup table and recall the target pressure threshold. In these examples, method 1550 can proceed directly from act 1552 to act 1556.

In act 1558, control circuitry determines whether the pressure measured in act 1552 is lower than the target pressure threshold generated in act 1556. The control circuitry can recall the measured pressure and the target pressure threshold from memory. If the pressure measured in act 1552 is lower than the target pressure threshold generated in act 1556, method 1550 proceeds to act 1560.

In act 1560, the control circuitry causes a user interface to display an icon indicating that the spray nozzle for which the pressure and flow rate were measured in act 1552 should be replaced, as described previously with respect to act 1510 of method 1500 (FIG. 15A).

If the pressure measured in act 1552 is not lower than the target pressure threshold generated in act 1556, method 1550 proceeds from act 1558 to act 1552. The acts of method 1550 can be performed iteratively to allow for continuous or substantially continuous monitoring of the spray nozzle to determine whether the spray nozzle is worn.

In some examples, it can be advantageous to proceed to act 1560 from act 1558 only when the pressure measured in act 1552 is lower than the target pressure threshold generated in act 1556 for a minimum time period. During the operation of the spray system, vibrations and other forces on components of the spray system can cause transient decreases in pressure. The transient pressure decreases from vibrations or other forces are temporary and are not indicative of spray nozzle wear. For example, in the operation of spray system 10, if vehicle 20 passes over uneven terrain, the resulting vibrations can cause a transient decrease in the pressure of one or more spray nozzles.

The minimum time is selected to discriminate between transient decreases in pressure due to vibrations and sustained decreases indicative of spray nozzle wear, as described with respect to increases in flow rate in method 1500.

Like method 1500, method 1550 can be performed simultaneously or substantially simultaneously for all spray nozzles in a spray system.

Advantageously, methods 1500 and 1550 allow an operator to determine whether a spray nozzle should be replaced without disassembling spray system 10. Pre-existing methods of detecting spray nozzle 32 wear include visual inspection by an operator to detect spray nozzle wear. Generally, an operator uses accumulated experience to determine whether a particular spray nozzle 32 appears to be sufficiently worn such that spray nozzle 32 should be replaced. Methods that use visual inspection by an operator are prone to error, potentially leading to the replacement of spray nozzles 32 that are behaving properly, resulting in unnecessary maintenance costs, or allowing for the continued use of spray nozzles 32 that are significantly worn, resulting in suboptimal spray by spray nozzles 32.

Other pre-existing methods of detecting spray nozzle 32 wear require operators to remove spray nozzles 32 from spray system 10 and manually measure an amount of water than can pass through spray nozzles 32 over a given period of time. For example, an operator can orient the aperture vertically such that gravity can cause water to pass through the aperture and measure an amount of water that can pass through the aperture due to gravity using, for example, a graduated cylinder. Alternatively, an operator can connect spray nozzle 32 to a separate pump and measure the amount of water that passes through spray nozzle 32 over a given period of time.

Some pre-existing methods do not inspect individual spray nozzles 32 for wear but rather replace spray nozzles 32 on a fixed schedule. For example, all spray nozzles 32 on boom 22 may be replaced after an arbitrary period of time (e.g., every one year or every two years). Like methods that use visual inspection, methods that replace all spray nozzles 32 on a fixed schedule can lead to replacement of spray nozzles 32 that are operating properly and are not significantly worn, creating unnecessary maintenance costs. Further, spray nozzles that are significantly worn continue to be used before the expiry of the arbitrary time period when spray nozzles 32 are replaced, resulting in periods of suboptimal spray by spray nozzles 32.

Methods 1500 and 1550 allow the wear of each individual spray nozzle 32 in spray system 10 to be monitored as spray system 10 is operated and without requiring disassembly of spray system 10. Methods 1500 and 1550 allow spray nozzles 32 to be replaced individually, reducing costs associated with unnecessary replacements of spray nozzles 32. Further, methods 1500 and 1550 allow control circuitry 150, 160 to be used accurately identify individually spray nozzles 32 that have worn and are creating suboptimal spray and alert an operator via user interface 154 to replace the worn spray nozzles 32. Methods 1500 and 1550 advantageously allow for the accurate detection of spray nozzle wear in spray systems in which many or all spray nozzles are worn and performing poorly. Because methods 1500 and 1550 use a lookup table rather than a system-wide average to determine a target flow rate and pressure, methods 1500 and 1550 are able to detect spray nozzle wear in spray systems were many or all spray nozzles are worn and performing poorly.

An operator applying fluid to a field using spray system 10 can monitor wear of spray nozzles 32 using user interface 154, substantially increasing the ease and efficiency of monitoring spray nozzle wear over conventional techniques.

Figure 16A:
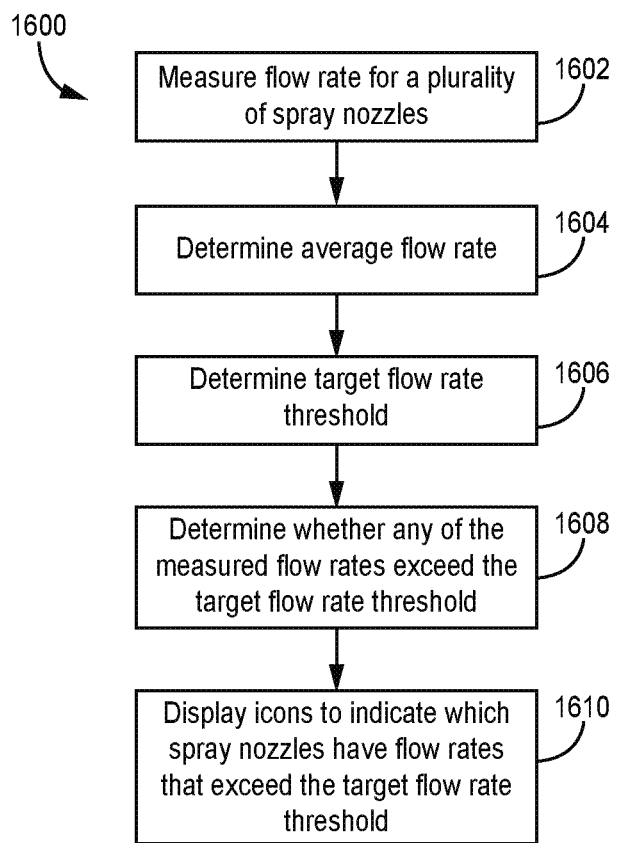
FIG. 16A is a flow diagram for yet another method of detecting spray nozzle wear.

FIG. 16A is a flow diagram of method 1600 of detecting spray nozzle wear. Method 1600 includes measuring a flow rate for a plurality of spray nozzles (act 1602), determining an average flow rate (act 1604), determining a target flow rate threshold (act 1606), determining whether any of the measured flow rates exceed the target flow rate threshold (act 1608), and displaying icons indicating which spray nozzles have measured flow rates that exceeded the target flow rate threshold (act 1610).

Method 1600 monitors flow rate across a plurality of nozzles to determine nozzle wear of individual nozzles. Monitoring flow across a plurality of nozzles allows method 1600 to detect spray nozzle wear without using a lookup table to determine a target flow rate value, as is used in method 1500 shown in and discussed in reference to FIG. 15A. Rather than use a lookup table to determine a target flow rate value, method 1550 uses the average flow rate of all monitored spray nozzles as a target value.

In act 1602, flow rate is measured for a plurality of spray nozzles. The flow rate of each spray nozzle is measured individually using flow rate sensors in a spray monitoring system. The spray monitoring system can include multiple flow rate sensors such that each single flow rate sensor is disposed adjacent to and configured to measure the flow rate of a single spray nozzle of the plurality of spray nozzles. The flow rate sensors are individually identified so that flow rate data produced by the flow rate sensors can be associated with a particular spray nozzle. For example, the spray monitoring system can be spray monitoring system 110, which individually measures flow rate for fluid sprayed by each spray nozzle. The flow rate sensors can be, for example, flow rate sensors 30B (FIG. 3). The sensed flow rates can be received by control circuitry, such as control circuitry 150, 160, and stored to a memory, such as memory 152, 162 (FIGS. 2-3).

In act 1604, an average flow rate is determined. The average flow rate is determined by averaging the flow rates measured in act 1602. Control circuitry can generate the average flow rate and store the average flow rate to a memory for use with subsequent acts of method 1600. The average flow rate can be used to approximate an ideal flow rate for one of the spray nozzles. A spray nozzle that significantly deviates from the average flow rate is likely worn and producing suboptimal spray, and should accordingly be replaced.

In act 1606, a target flow rate threshold is determined. The target flow rate threshold is based on the average flow rate value determined in act 1604 and represents the largest flow rate value that should be measured for a nozzle that is not significantly worn. The target flow rate threshold represents the maximum value of a flow rate measured in act 1602 that produces acceptable spray quality. A flow rate measured in act 1602 that exceeds the target flow rate threshold indicates that the spray nozzle is worn and is not producing spray with acceptable spray quality, and accordingly should be replaced. The target flow rate threshold is determined in substantially the same manner as in act 1506 of method 1500.

The target flow rate threshold can be generated by the control circuitry. The reference value used to generate the target flow rate threshold can be stored to a memory and can be recalled by the control circuitry in act 1606 to determine the target flow rate threshold.

In act 1608, control circuitry determines whether any of the flow rates measured in act 1602 exceed the target flow rate threshold generated in act 1606. Specifically, the control circuitry compares each flow rate measured in act 1602 with the target flow rate threshold generated in act 1606. The control circuitry can recall the measured flow rates and the target flow rate threshold from a memory. The control circuitry can store identifiers corresponding to each flow rate sensor measuring a flow rate higher than the target flow rate threshold to a memory for use with act 1610.

In act 1610, the control circuitry causes a user interface to display icons indicating which spray nozzles have measured flow rates that exceeded the target flow rate threshold. Control circuitry can recall the flow rate senor identifiers stored in act 1608 and use the stored identifiers to generate icons indicating that each corresponding spray nozzle is worn and should be replaced. The icons can take any selected form, such as text, one or more shapes or symbols, and one or more colors, among other options.

In some examples, it can be advantageous only to display icons indicating that a spray nozzle is worn and should be replaced in act 1610 when a flow rate measured in act 1602 exceeds the target flow rate threshold generated in act 1606 for a minimum time period. During the operation of the spray system, vibrations and other forces on components of the spray system can cause transient increases in flow rate. The transient increases in flow rate from vibrations or other forces are temporary and are not indicative of spray nozzle wear. The minimum time is selected in substantially the same way as discussed previously with respect to method 1500 (FIG. 15A).

Figure 16B:
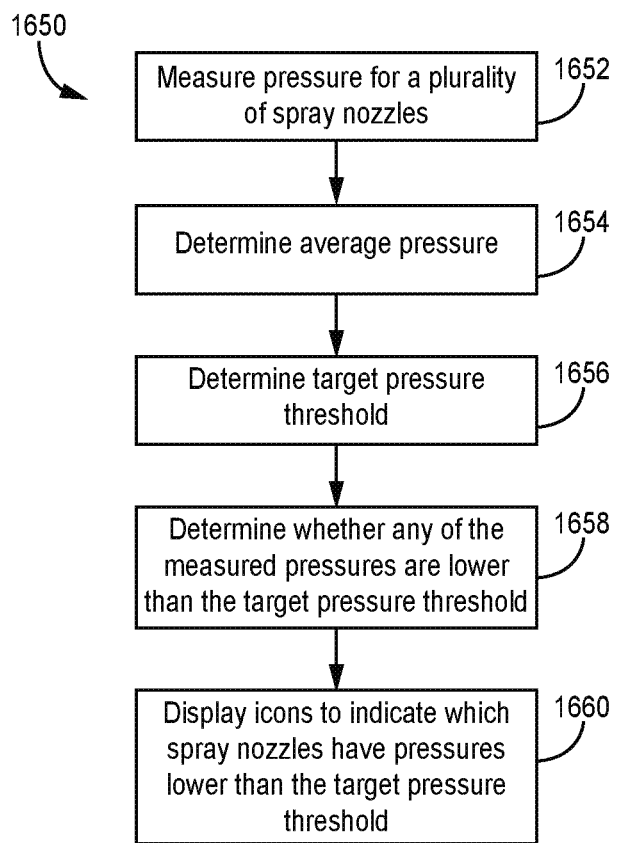
FIG. 16B is a flow diagram for another method of detecting spray nozzle wear.

FIG. 16B is a flow diagram of method 1650 of detecting spray nozzle wear. Method 1650 includes measuring a pressure for a plurality of spray nozzles (act 1652), determining an average pressure (act 1654), determining a target pressure threshold (act 1656), determining whether any of the measured pressures are lower than the target pressure threshold (act 1658), and displaying icons indicating which spray nozzles have measured pressures lower than the target pressure threshold (act 1660).

Method 1650 is similar to method 1600 but monitors pressure across a plurality of nozzles to determine nozzle wear of individual nozzles. Monitoring pressure across a plurality of nozzles allows method 1650 to detect spray nozzle wear without using a lookup table to determine a target pressure value, as is used in method 1550 discussed in reference to FIG. 15B. Rather than use a lookup table to determine a target pressure value, method 1650 uses the average pressure of all monitored spray nozzles as a target value.

In act 1652, pressure is measured for a plurality of spray nozzles, similar to the flow rate measurement in act 1602 of FIG. 16A.

In act 1654, an average pressure is determined, similar to the average flow rate in act 1604 of FIG. 16A.

In act 1656, a target pressure threshold is determined, similar to the target flow rate threshold in act 1606 of FIG. 16A. The target pressure threshold is determined in substantially the same manner as in act 1556 of method 1500.

In act 1658, control circuitry determines whether any of the pressures measured in act 1652 are lower than the target pressure threshold generated in act 1656. Specifically, the control circuitry compares each pressure measured in act 1652 with the target pressure threshold generated in act 1656. The control circuitry can recall the measured pressures and the target pressure threshold from a memory. The control circuitry can store identifiers corresponding to each pressure sensor measuring a pressure lower than the target pressure threshold to a memory for use with act 1660.

In act 1660, the control circuitry causes a user interface to display icons indicating which spray nozzles have measured pressures lower than the target pressure threshold, similar to act 1610 of FIG. 16A.

Methods 1600 and 1650 advantageously allow an operator to determine whether a spray nozzle should be replaced without disassembling spray system 10. An operator applying fluid to a field using spray system 10 can monitor wear of spray nozzles 32 using user interface 154, substantially increasing the ease and efficiency of monitoring spray nozzle wear over conventional techniques. Further, methods 1600 and 1650 compare relative spray nozzle wear of all nozzles in a spray system. Methods 1600 and 1650 do not require lookup tables to determine target flow rate and pressure values to determine spray nozzle wear. This reduces the time and labor required to configure systems performing methods 1600 and/or 1650.

Like methods 1500 and 1550, methods 1600 and 1650 allow the wear of each individual spray nozzle 32 in spray system 10 to be monitored as spray system 10 is operated and without requiring disassembly of spray system 10. Methods 1600 and 1650 also allow spray nozzles 32 to be replaced individually, reducing costs associated with unnecessary replacements of spray nozzles 32. Further, methods 1600 and 1650 allow control circuitry 150, 160 to be used accurately identify individually spray nozzles 32 that have worn and are creating suboptimal spray and alert an operator via user interface 154 to replace the worn spray nozzles 32.

The acts of methods 1500, 1550, 1600, and/or 1650 can be performed over a relatively short time period, such as the measurement interval of the pressure sensors used to measure the pressures in acts 1502, 1552, 1602, and 1652, respectively. For example, the measurement interval of the pressure sensors can be 0.5 seconds, 1 seconds, 2 seconds. Methods 1500, 1550, 1600, and/or 1650 can also be performed over substantially shorter time periods than the measurement interval of the pressure sensors.

While the disclosure has been described with reference to exemplary embodiments, it will be understood by those skilled in the art that various changes may be made and equivalents may be substituted for elements thereof. In addition, many modifications may be made to adapt a particular situation or material to the teachings of the disclosure without departing from the essential scope thereof.

The invention claimed is:

1. A monitoring system for an agricultural sprayer, the monitoring system comprising:
    a plurality of spray nozzles, wherein each of the plurality of spray nozzles is configured to spray a fluid;
    a plurality of spray monitoring sensors, wherein each of the plurality of spray monitoring sensors is disposed adjacent to a corresponding one of the plurality of spray nozzles, and is configured to measure a spray parameter of that corresponding one of the plurality of spray nozzles;
    a plurality of electromagnetic sensors for sensing a magnetic field, wherein:
        the plurality of electromagnetic sensors are configured to generate a plurality of signals when the plurality of electromagnetic sensors sense the magnetic field; and
        each of the plurality of electromagnetic sensors is disposed adjacent to and each of the plurality of signals is representative of one of the plurality of spray monitoring sensors; and
    control circuitry in electronic communication with the plurality of electromagnetic sensors, wherein the control circuitry is configured to:
        receive the plurality of signals from the plurality of electromagnetic sensors in a received signal order; and
        assign physical locations to the plurality of spray monitoring sensors based on the received signal order and a predetermined sequential order.

2. The monitoring system of claim 1, wherein the physical locations are predetermined locations along a spray boom.

3. The monitoring system of claim 2, wherein the control circuitry is configured to assign each of the plurality of predetermined locations along the spray boom to one of the plurality of electromagnetic sensors to determine the physical location of each of the plurality of electromagnetic sensors.

4. The monitoring system of claim 1, wherein the predetermined sequential order comprises a predetermined start point with a known location.

5. The monitoring system of claim 1, wherein the control circuitry is further configured send an activation signal to the plurality of electromagnetic sensors to activate the plurality of electromagnetic sensors from an inactive state before sensing the magnetic field at each of the plurality of electromagnetic sensors.

6. The monitoring system of claim 1, wherein the control circuitry is further configured to send a deactivation signal to cause the plurality of electromagnetic sensors to enter an inactive state after communicating the sensed magnetic field to the control circuitry.

7. The monitoring system of claim 1, wherein the spray parameter comprises at least one parameter selected from the group consisting of a fluid pressure and a fluid flow rate.

8. A method of locating spray monitoring sensors, the method comprising:
    sensing a magnetic field at each of a plurality of electromagnetic sensors in a predetermined sequential order to generate a plurality of signals representative of one of a plurality of spray monitoring sensors, wherein:
        each of the plurality of electromagnetic sensors are disposed adjacent to one of the plurality of spray monitoring sensors; and
        each of the plurality of spray monitoring sensors is disposed adjacent to a corresponding one of a plurality of spray nozzles, and is configured to measure a spray parameter of that corresponding one of the plurality of spray nozzles;
    communicating the plurality of signals by the plurality of electromagnetic sensors when each of the plurality of electromagnetic sensors senses the magnetic field;
    receiving, by control circuitry, the plurality of signals in a received signal order; and
    assigning, by the control circuitry, physical locations to the plurality of spray monitoring sensors based on the predetermined sequential order and the received signal order.

9. The method of claim 8, wherein the physical locations are predetermined locations along a spray boom.

10. The method of claim 8, wherein the predetermined sequential order comprises a predetermined start point.

11. The method of claim 8, further comprising sending, by the control circuitry, a plurality of activation signals to the plurality of electromagnetic sensors to activate the plurality of electromagnetic sensors before sensing the magnetic field at each of the plurality of electromagnetic sensors.

12. The method of claim 8, further comprising sending, by the control circuitry and after communicating the plurality of signals, a plurality of deactivation signals to the plurality of electromagnetic sensors to cause the plurality of electromagnetic sensors to enter an inactive state.

13. The method of claim 8, wherein each of the plurality of spray monitoring sensors is positioned adjacent to and configured to measure a spray parameter of one of a plurality of spray nozzles.

14. The method of claim 13, wherein the spray parameter is at least one of a fluid pressure and a fluid flow rate.

* * * * *